US009292786B2

(12) United States Patent
Nagarajan et al.

(10) Patent No.: US 9,292,786 B2
(45) Date of Patent: Mar. 22, 2016

(54) UNIVERSAL BALANCING CONTROLLER FOR LATERAL STABILIZATION OF BIPEDAL ROBOTS IN DYNAMIC UNSTABLE ENVIRONMENTS

(71) Applicant: DISNEY ENTERPRISES, INC., Burbank, CA (US)

(72) Inventors: Umashankar Nagarajan, Sunnyvale, CA (US); Katsu Yumane, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 76 days.

(21) Appl. No.: 14/171,208

(22) Filed: Feb. 3, 2014

(65) Prior Publication Data

US 2015/0217448 A1    Aug. 6, 2015

(51) Int. Cl.
*B62D 57/00*    (2006.01)
*G06N 3/00*    (2006.01)
*B62D 57/032*    (2006.01)

(52) U.S. Cl.
CPC ............. *G06N 3/00* (2013.01); *B62D 57/032* (2013.01); *Y10S 901/01* (2013.01); *Y10S 901/19* (2013.01); *Y10S 901/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,199,249 | A * | 8/1965 | Carver ................... | A63H 11/10 294/106 |
| 5,838,130 | A * | 11/1998 | Ozawa ................... | B62D 57/02 180/8.1 |
| 6,064,167 | A * | 5/2000 | Takenaka ............. | B62D 57/032 318/568.12 |
| 7,657,345 | B2 * | 2/2010 | Endo ....................... | B25J 9/161 318/568.17 |

(Continued)

OTHER PUBLICATIONS

Anderson, et al, "Approximate Policy Transfer Applied to Simulated Bongo Board Balance", International Conference on Humanoid Robots, Nov. 29-Dec. 1, 2007, pp. 490-495.

(Continued)

*Primary Examiner* — Jonathan L Sample
(74) *Attorney, Agent, or Firm* — Marsh Fischmann & Breyfogle LLP; Kent A. Lembke

(57) ABSTRACT

A robot, such as a bipedal robot, that includes three or more rigid links such as two legs and a pelvis. The robot includes joints pivotally connecting pairs of the rigid links and an actuator associated with each of the joints. The robot includes a universal balancing controller with an output feedback control module providing control signals to selectively drive the actuators to balance the robot on a support element which may be configured to provide a dynamic, unstable environment or to provide a static, stable environment. During use, the control signals are generated in response to processing of global robot data from sensors associated with the rigid links or the joints. The control signals are generated by the output feedback control module without any need for measurements of the support element or without any measurement of a dynamic environment.

16 Claims, 15 Drawing Sheets

(56) References Cited

U.S. PATENT DOCUMENTS

| | | | | |
|---|---|---|---|---|
| 7,761,184 B2* | 7/2010 | Moridaira | B25J 9/1674 | 318/568.12 |
| 8,311,677 B2* | 11/2012 | Yoshiike | B62D 57/032 | 700/245 |
| 9,020,639 B2* | 4/2015 | Bewley | B25J 5/005 | 700/250 |
| 9,211,201 B2* | 12/2015 | Herr | A61F 2/72 | |
| 2002/0079857 A1* | 6/2002 | Ishii | B25J 9/1638 | 318/568.12 |
| 2004/0015265 A1* | 1/2004 | Asano | B25J 13/003 | 700/245 |
| 2004/0133308 A1* | 7/2004 | Kato | G06N 3/008 | 700/245 |
| 2004/0176875 A1* | 9/2004 | Iribe | G06N 3/008 | 700/245 |
| 2004/0205417 A1* | 10/2004 | Moridaira | B62D 57/032 | 714/48 |
| 2005/0066397 A1* | 3/2005 | Hidai | B62D 57/032 | 700/245 |
| 2005/0067993 A1* | 3/2005 | Kato | B25J 19/0091 | 318/568.12 |
| 2005/0104548 A1* | 5/2005 | Takenaka | B62D 57/032 | 318/568.12 |
| 2005/0113973 A1* | 5/2005 | Endo | B25J 9/161 | 700/245 |
| 2006/0025888 A1* | 2/2006 | Gutmann | G06T 7/0075 | 700/245 |
| 2006/0033462 A1* | 2/2006 | Moridaira | B25J 9/1674 | 318/568.12 |
| 2006/0247799 A1* | 11/2006 | Takenaka | B62D 57/032 | 700/54 |
| 2007/0013506 A1* | 1/2007 | Takenaka | B62D 57/032 | 340/500 |
| 2007/0016329 A1* | 1/2007 | Herr | B62D 57/032 | 700/250 |
| 2008/0258670 A1* | 10/2008 | Yoshikawa | G05B 19/40 | 318/568.22 |
| 2009/0055021 A1* | 2/2009 | Sano | B62D 57/032 | 700/254 |
| 2009/0301798 A1* | 12/2009 | Yang | B62D 57/032 | 180/8.6 |
| 2009/0306824 A1* | 12/2009 | Zaier | B62D 57/032 | 700/250 |
| 2010/0070076 A1* | 3/2010 | Zaier | B62D 57/032 | 700/245 |
| 2010/0185330 A1* | 7/2010 | Kwon | B62D 57/032 | 700/261 |
| 2010/0222927 A1* | 9/2010 | Zaier | B62D 57/032 | 700/254 |
| 2011/0098860 A1* | 4/2011 | Yoshiike | B62D 57/032 | 700/260 |
| 2011/0106313 A1* | 5/2011 | Lee | B25J 5/007 | 700/259 |
| 2011/0231050 A1* | 9/2011 | Goulding | B62D 57/024 | 701/26 |
| 2013/0131865 A1* | 5/2013 | Yamane | B25J 9/1692 | 700/254 |
| 2015/0051734 A1* | 2/2015 | Zheng | B25J 9/1633 | 700/261 |

OTHER PUBLICATIONS

Hubler, et al, "A Case Study on Balance Recovery in Slacklining", International Conference on Biomechanics in Sports, Conference Proceedings; 2010, vol. 28.

Lee, et al, "A Momentum-based Balance Controller for Humanoid Robots on Non-level and Non-stationary Ground", Autonomous Robots, Nov. 2013, vol. 33, pp. 399-414.

Bauby et al, "Active Control of Lateral Balance in Human Walking", Journal of Biomechanics, vol. 33, Apr. 26, 2000, pp. 1433-1440.

Paoletti, et al, "Balancing on Tightropes and Slacklines", Journal of the Royal Society Interface, Apr. 18, 2012, pp. 2097-2108.

Anderson, et al, "Adaptive Torque-based Control of a Humanoid Robot on an Unstable Platform", 2010 IEEE-RAS International Conference on Humanoid Robots, Nashville, TN, Dec. 6-8, 2010.

Zheng, et al, "Ball Walker: A Case Study of Humanoid Robot Locomotion in Non-stationary Environments", 2011 IEE International Conference on Robotics and Automation, Shanghai, China.

Yu, Jen-te, "A Convergent Algorithm for Computing Stabilizing Static Output Feedback Gains", IEE Transactions on Automatic Control, vol. 49, No. 12, Dec. 2004, pp. 2271-2275.

* cited by examiner

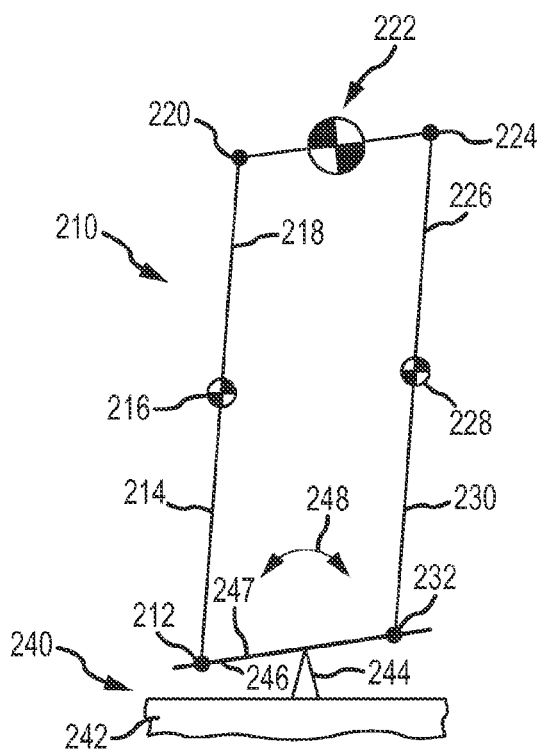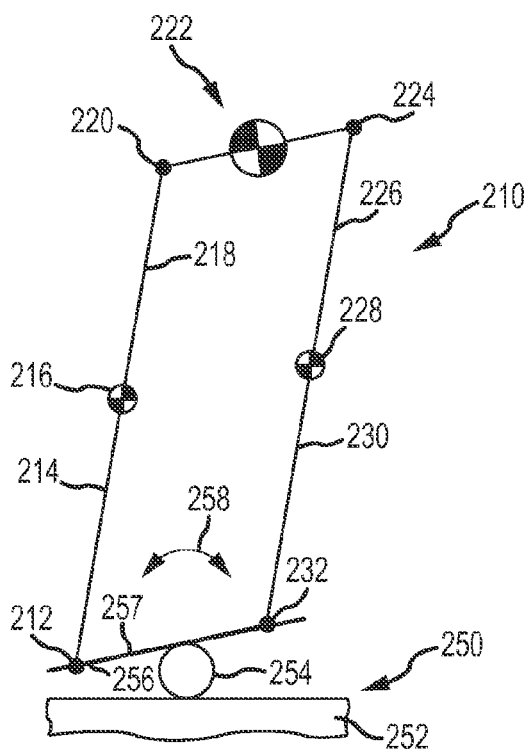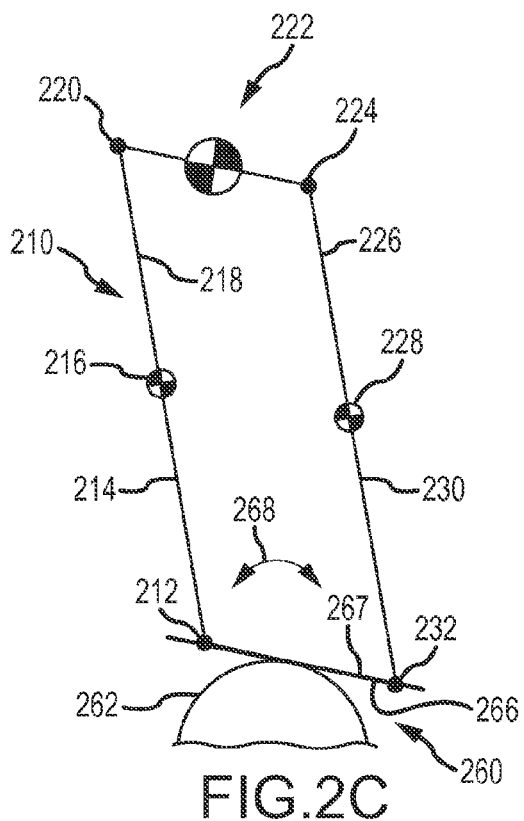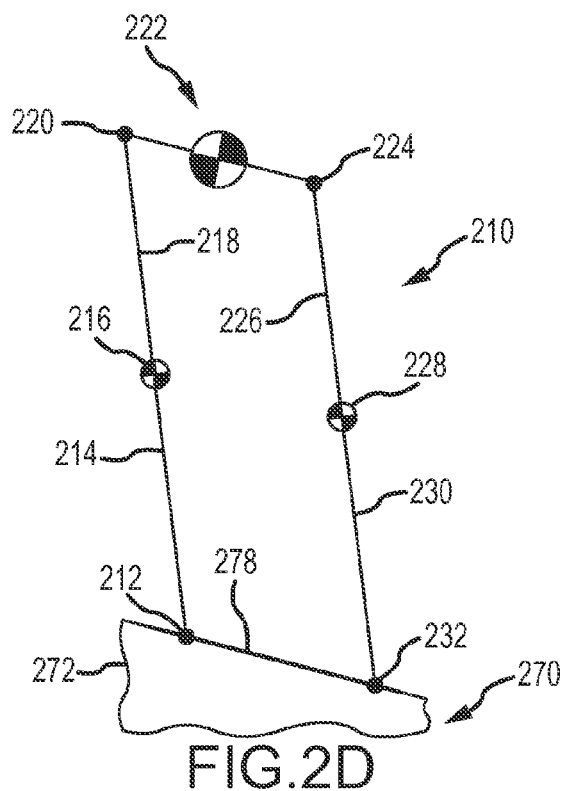

UNIVERSAL BALANCING CONTROLLER FOR LATERAL STABILIZATION OF BIPEDAL ROBOTS IN DYNAMIC UNSTABLE ENVIRONMENTS

BACKGROUND

1. Field of the Description

The present invention relates, in general, to improved techniques for controlling humanoid robots and other bipedal robots, and, more particularly, to control methods and controllers for bipedal robots that provide enhanced balancing especially when the robots are placed in dynamic and, oftentimes, unstable environments.

2. Relevant Background

Robots or robotic devices, including bipedal robots (which may be humanoid robots) are widely used in manufacturing, assembly, packing and packaging, earth and space exploration, surgery, laboratory research, and entertainment. Some robots may include a series of rigid links or bodies linked together by joints, and some or all of the links may be moved or pivoted about the joints by actuators. Actuators are like the muscles of a robot as they respond to control signals, such as from a control system or controller, to convert energy into movement. The majority of robots use electric motors (DC or AC motors) as actuators to spin a wheel or gear while some actuators are provided in the form of linear actuators or other types of actuators. A hand (or foot) of a robot may be referred to as an end effector while the arm (or leg) is referred to as a manipulator, and these systems or devices of the robot may be made up of a number of rigid links or members interconnected by joints with movement at the joints controlled by actuators.

An ongoing challenge for those in the field of robotics is how to best or better control a bipedal robot. Particularly, dynamic balancing of bipedal robots is one of the most fundamental yet challenging problems in robotics research. Research has generated a large body of literature and control theories in the areas of controlling bipedal robots including postural balancing, push recovery, and walking. Several bipedal robots have been built that exploit the passive dynamic stability in the sagittal plane. However, the majority of bipedal robotics research has focused on balancing and motion generation in the sagittal plane. Further, the controllers for these bipedal robots was written or generated with the underlying assumption that the environment properties are known, which allows the environment and the bipedal robot to be modeled and then control theory to be applied to provide a useful controller.

There remains a need for a controller for bipedal robots that is useful for providing robust lateral stabilization in many types of changing or varying environments and not just in known stable environments. In other words, a universal balancing controller is desired for using in controlling bipedal robots in dynamic environments that may also be unstable. For example, humans have the ability to successfully balance in both static and dynamic environments, and it would be useful to provide a robot controller (or control methods) that enables a bipedal robot to stabilize dynamic, unstable environments such as a bipedal robot positioned on a seesaw or a bongo board.

SUMMARY

Briefly, the following description teaches a universal balancing controller for use with bipedal robots in dynamic and/or unstable environments. The balancing controller is adapted to enable bipedal robots to stabilize the robot in dynamic, unstable environments such as, but not limited to, a seesaw and a bongo board and also to stabilize in static environments such as a curved floor and a non-level flat floor.

The controller is described in a way that presents and validates the following two hypotheses (which were identified by the inventors): (1) the environment data is not essential to stabilize a bipedal robot in dynamic and unstable environments and (2) a single balancing control strategy is sufficient to stabilize a bipedal robot in static and dynamic, unstable environments. The first hypothesis is validated by deriving output feedback controllers for a planar bipedal robot (e.g., the balancing controller is an output feedback controller) that successfully stabilizes seesaw and bongo board models using only the global robot data and without any information of the dynamic environment. For example, the description provided herein shows that global pelvic position, velocity, and link angle measurements are sufficient to allow the controller to stabilize the bipedal robot in both the seesaw model and the bongo board model.

The second hypothesis is validated by deriving a novel universal balancing controller as an output feedback controller. The output feedback controller presented by the inventors successfully stabilizes a planar bipedal robot in dynamic and unstable environments such as a seesaw, a bongo board, or a curved floor and also stabilizes the same planar bipedal robot when it is positioned in a static environment such as upon a flat floor (level or non-level).

It is useful to understand that the bipedal robot dynamics in these different environments have state spaces with different dimensions. The same controller, though, can be used to stabilize these different dynamic systems, which makes the robot controller a truly universal controller for the various environments in which a bipedal robot may be placed or used (and that are discussed in detail in the following description and figures). This is achieved, in part, by designing the universal controller as an output feedback controller. Additionally, the control inputs from the controller and the outputs that are fed back to the controller are kept the same for each of the different models (dynamic and static models).

More particularly, a robot is provided that includes three or more rigid links such as a bipedal robot. The robot also includes joints pivotally connecting pairs of the rigid links and an actuator associated with each of the joints. The robot also includes a universal balancing controller that includes an output feedback control module providing control signals to selectively drive the actuators to balance the robot on a support element (e.g., a board or planar surface such as a board or a flat or sloped floor). During use of the controller, the control signals are generated in response to processing of global robot data from sensors associated with the rigid links or the joints.

In some embodiments of the robot, the rigid links include at least two leg links and a pelvis link connecting ends of the two leg links. Then, the joints include a pair of ankle joints and a pair of hip joints, and the global robot data includes link angles and global pelvis measurements. In this regard, the global pelvis measurements may include measurements of a position and a velocity of the pelvis link.

Significantly, the control signals are generated by the output feedback control module without any need for measurements of the support element. Further, the support element may be configured to provide a static environment or a dynamic environment for supporting the balancing robot (e.g., the same controller may be used to balance a robot in both a static and a dynamic, unstable environment without need for a unique controller for each likely environment in which the robot may be used). In some embodiments, the dynamic environment is configured as a bongo board or a seesaw. In practice, the control signals that are generated by the controller stabilize a board of the bongo board or a board of the seesaw via controlled movement of the robot. In some cases, the static or stable environment is provided by a flat floor or by a flat and sloped floor.

BRIEF DESCRIPTION OF THE DRAWINGS

FIGS. 2A-2D schematically illustrate a number of robots modeled to consider robust lateral stabilization with a universal balancing controller of the present description;

DETAILED DESCRIPTION

Figure 1:
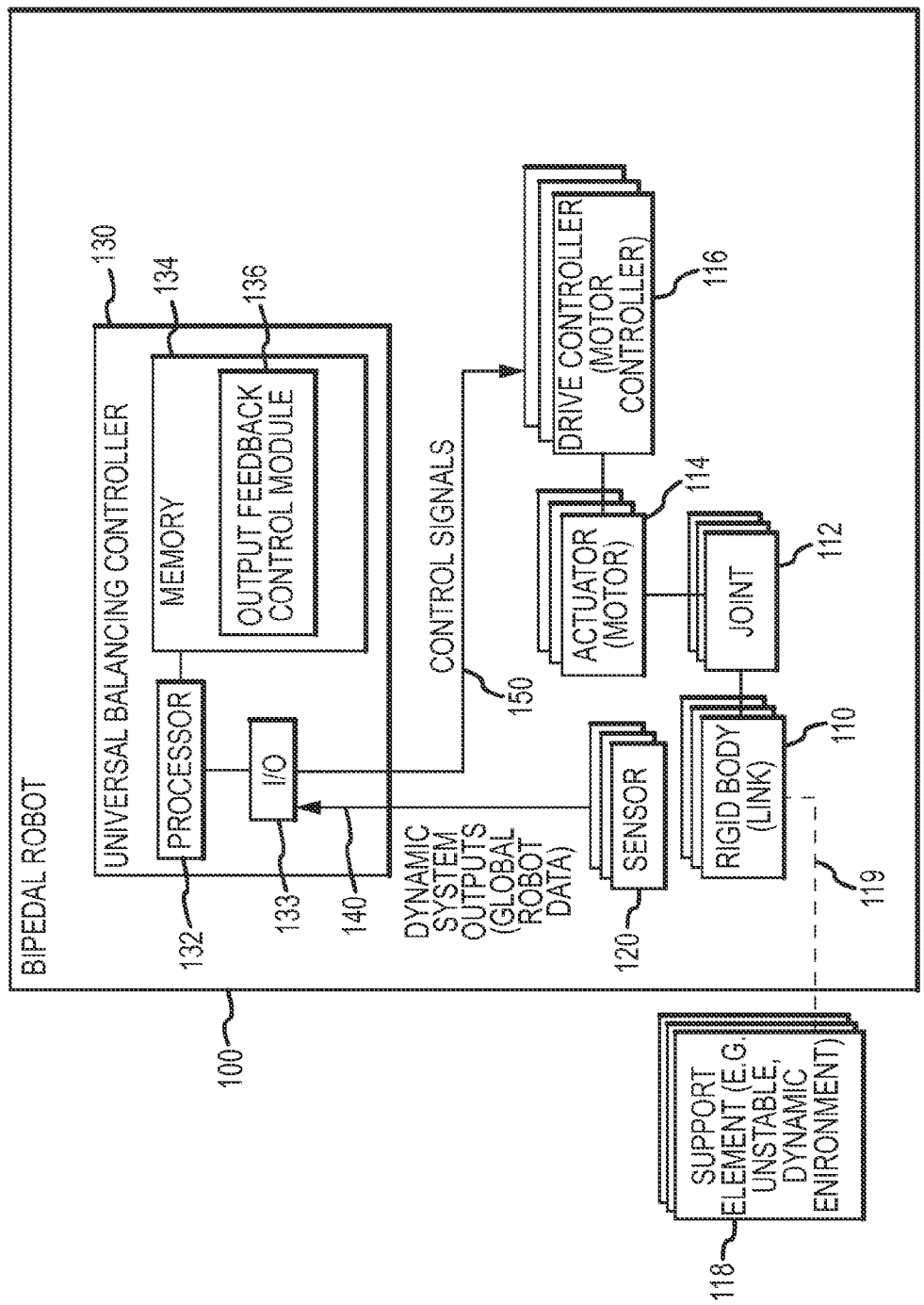
FIG. 1 illustrates a functional block diagram of an exemplary bipedal robot balancing on a support element (e.g., placed or positioned in a dynamic and unstable environment such as on a seesaw or bongo board) with a universal balancing controller of the present description used to provide control over the bipedal robot in a variety of environments or implementations.

The following teaches a controller (control method) for bipedal robots that may be considered a universal balancing controller for robust lateral stabilization of such robots in dynamic, unstable environments and also in stable environments. The description analyzes the robustness of the derived universal balancing controller to disturbances and parameter uncertainties, and the description also demonstrates the universality and superiority of the universal balancing controller to the best tuned linear quadratic regulator (LQR) and $H_\infty$ controllers. The description also presents nonlinear simulation results of the universal controller's successful stabilization of a family of bongo board, curved floor, seesaw, and tilting and rocking floor models.

Significant efforts have been made to provide controllers for bipedal robot. These controllers typically require knowledge of the environment, require environmental inputs to adequately stabilize the robot in a dynamic environment, and/or have other limiting characteristics. For example, researchers have shown that, while walking, humans may exploit the passive dynamic properties in the legs in the sagittal plane, but they need to use significant active control to stabilize their lateral motions. Others have presented control strategies for stabilizing unstable lateral motions of 3D passive dynamic walkers while others teach stepping strategies that can successfully reject lateral disturbances during bipedal walking. Some controller research has been directed toward hierarchical control strategies to reject lateral disturbances on a robot, and other research derived controllers for balancing on tightropes and slack lines. Controllers have been generated that use momentum-based control strategies that actively control the ground reaction forces on each foot to stabilize humanoid robots on non-level and rocking floors. Researchers have presented controllers that enable bipedal robots to walk on a rolling ball while others presented approximate value function-based control approaches to stabilize humanoid robots on bongo boards. Further, research has also been completed and presented that shows an adaptive policy that mixes control strategies for stabilizing humanoid robots on a seesaw.

While providing useful control, these controllers had a number of limitations that do not allow these controllers to be used in any dynamic and unstable environment to provide robust lateral stabilization of a bipedal robot. Many of the controllers discussed above did not deal with or address stabilizing a robot in unstable environments like a bipedal robot supported upon a seesaw or a bongo board. Further, some of the control research work was restricted to motion in the sagittal plane. Other controllers were useful for demonstrating successful balancing on a seesaw. However, this controller research did not include any results of stabilizing the seesaw, and it dealt with designing different and specific controllers for balancing in each of number of different dynamic environments (e.g., one controller for a seesaw environment, one controller for a bongo board, and so on).

In contrast, the present description teaches a robot controller that may be used for robust lateral stabilization of bipedal robots in dynamic and unstable environments. The robot controller may include an output feedback controller (or output feedback control module) that may be derived or created for planar bipedal robots to successfully balance and stabilize dynamic, unstable environments such as a bipedal robot on a seesaw or a bongo board. Such stabilizing may be achieved using only link angles and global pelvis measurements or "global robot data." As far as the inventors are aware, this teaching is the first conclusive proof that bipedal robots can successfully stabilize in dynamic and unstable environments with only global robot data and without any measurement of the dynamic environment.

The following description further presents algorithms that find output feedback controllers that maximize the family of bongo board, seesaw, curved floor, and flat floor models that can be stabilized by a robot controller implementing/utilizing one of these output feedback controllers. A first-of-its-kind universal balancing controller is derived as an output feedback controller, which successfully operates to stabilize planar bipedal robots in static environments like flat floors and also in dynamic and unstable environments like seesaws and bongo boards. In this way, the controller provides a control approach in which a single controller stabilizes different dynamic systems with state spaces of different dimensions. The inventors performed and describe herein a detailed analysis of the robustness of the derived universal controller to disturbances and parameter uncertainties. Further, the description demonstrates the universal controller's universality and superiority to the best tuned LQR and $H_\infty$ controllers. The description also presents nonlinear simulation results of the universal controller's successful stabilization of a family of modeled environments (e.g., bongo board, seesaw, curved floor, tilting floor, and rocking floor models).

FIG. 1 illustrates an embodiment of a humanoid or bipedal robot or, more generally, a rigid-body dynamical system 100 that is positioned upon or balancing upon a support element 118. The support element 118 may be thought of as the "environment" of the robot 100, and it may take a variety of forms to practice the present invention. For example, the support element 118 may be a seesaw, a bongo board, a curved floor, or the like to provide a dynamic and unstable environment or may be a flat floor/surface or a sloped flat surface to provide a static environment.

To allow robust balancing on or in the environment or on the support element 118, the bipedal robot includes a universal balancing controller 130 configured according to the present description. The robot 100 may be a 2D (planar) robot or a 3D robot and includes a plurality of rigid bodies or links 110 such as may be found in a walking humanoid robot and the like, and the links 110 may be linked together with joints 112. For example, the joints 112 may include a hip joints, knee joints, and an ankle joint connecting links 110 such as the foot to the lower leg, the lower leg to the upper leg, the upper leg to the hip joints, and the hip joints to the pelvis.

The robot or system 100 is actuated and, to this end, an actuator (e.g., a driver such as an AC or DC motor, a hydraulic or pneumatic actuator that may be rotary or linear, or the like) 114 is provided for each joint 112 that is actively moved or controlled (e.g., the knee may be "locked" in some embodiments as in some of the models discussed below) such that each actuated joint is active (while the knee or other joints may concurrently be passive). In other words, an actuator 114 may be provided for each degree of freedom (DOF) of the robot/system 100. Each of the actuators 114 is selectively operated by a drive controller 116, which may in the form of a motor controller or the like that causes the actuator to apply a particular torque on or at the joint 112.

The robot or system 100 is a constrained system as it includes (or operates upon or adjacent to) a support element(s) 118. For example, a floor, which is flat or sloped, may provide the support element 118 for the floating base(s) of a walking humanoid robot 100. The foot or lower-most link 110 may be placed on an upper surface of the support element 118, and the connection/attachment/interface 119 between the foot/lower-most link 110 may be designed or modeled such that the foot/link 118 does not slip on the support element during balancing control.

The robot or system 100 further may include sensors 120 that sense locations and/or movements of the rigid links 110 and/or joints 112 and provide these inputs/sensor readings 140 to the universal balancing controller 130 to allow location and movements of the links 110 and joints 112 to be determined in real time and a near instantaneous manner to allow control signals 150 to be generated in response. The sensors 120 do not need to provide information or data regarding the environment 118, and the dynamic system outputs 140 may be thought of as global robot data and may include link angles and global pelvis measurements (e.g., measured position and velocity of the robot's pelvis link 110).

Significantly, the robot or system 100 includes a universal balancing controller 130 that functions to provide control signals (e.g., torque values) 150 to each of the drive controllers 116 to control each of the actuators 114. As discussed throughout this description, the control signals 150 are generated to allow the bipedal robot 100 to balance on the support element 118 and to stabilize the often dynamic environment/element 118. This is achieved by configuring the controller 130 as an output feedback controller with output feedback control module 136 that processes the global robot data 140 from sensors 120 to determine the control signals 150.

To this end, the controller 130 includes a processor (or CPU) 132 that manages operation of input/output (I/O) devices 133 that act to receive signals 140 from the sensors 120 and to output control signals 150 to the drive controllers 116. The processor 132 also manages memory 134 so as to execute programs, software, or executable code in the form of and/or including the output feedback control module 136. The module 136 processes dynamic systems outputs/global robot data 140 to generate torque or other output useful for generating the control signals 150 to operate actuators 114 (e.g., apply a torque at a joint 112 related to the balancing of the robot 100 on support element).

FIGS. 2A-2D schematically illustrate a number of robots that the inventors modeled to consider robust lateral stabilization with a universal balancing controller of the present description on or in four different static and dynamic (and unstable) environments. Each of FIGS. 2A-2D shows a bipedal robot 210 that was modeled as a planar four-bar linkage. The bipedal robot 210 includes ankle joints 212, 232 and lower leg links 214, 230 connected to upper leg links 218, 226 via knee joints 216, 228 (which may be fixed/stationary in modeling). The robot 210 also includes hip joints 220, 224 connecting a pelvis link 222 to the upper leg links 218, 226. In practice, actuators (not shown) may be provided for ankle joints 212, 232 and hip joints 220, 224 and, in some cases, for knee joints 216, 228. Sensors (not shown) would be provided to collect global robot data including link angles and global pelvis measurements (e.g., position and velocity of pelvis link 222).

In FIG. 2A, the bipedal robot 210 is positioned upon a dynamic, unstable environment 240 in the form of a seesaw. The environment (or support element) 240 includes a support member/floor 242 upon which a pivot member 244 is provided in the form of a triangular cross section element (e.g., with a point or zero radius contact surface). A plank or planar board 246 is balanced on top of the pivot member 244, and the robot 210 is positioned to be in contact with an upper surface 247 of the board 246. During operations, the board 246 may pivot and move as shown with arrow 248 on the contact surface of the pivot member 244. The robot 210 is positioned with one foot and its associated ankle joint 212 on one side of the pivot member 244 and one foot and its associated ankle joint 232 on the second or other side of the pivot member 244. Typically, the modeling involves assuming there is no slip between each foot link and the surface 247.

In FIG. 2B, the robot 210 is positioned upon a dynamic, unstable environment 250 in the form of a bongo board. The environment/support element 250 includes support member/floor 252 upon which a ball or cylinder 254 is positioned. A plank or planar board 256 is placed upon the ball/cylinder 254 so as to pivot as shown with arrow 258. The robot 210 has one foot and associated ankle joint 212, 232 placed upon the upper surface 257 of the board 256 on either side of a pivot point or contact interface between the ball/cylinder 254 and the lower surface of the board 256.

In FIG. 2C, the robot 210 is positioned upon a dynamic environment 260 in the form of a static curved floor 262 (e.g., the shown semi-cylinder does not move). A plank or planar board 266 is placed upon the curved floor 262 so as to pivot as shown with arrow 268. The robot 210 has one foot and associated ankle joint 212, 232 placed upon the upper surface 267 of the board 266 on either side of a pivot point or contact interface between the curved floor 262 and the lower surface of the board 266. In FIG. 2D, the robot 210 is positioned upon a static environment 270 in the form of a sloped floor 272 with an upper, sloped surface 278, and the environment 270 is static as the support surface 272 does not move or pivot as do the environments 240, 250, 260.

At this point, it may be useful to provide background and explanation of static output feedback control prior to turning to discussion of robot and dynamic environment models (e.g., to discussion of the universal balancing controller of the present description that may be used to stabilize the robots 210 in the differing environments 240, 250, 260, and 270 of FIGS. 2A-2D). The universal balancing controller presented herein can be formulated as a static output feedback controller, and the following is a brief discussion of static output feedback control design.

Output feedback stabilization problems are often formulated as optimization problems with bilinear matrix inequalities (HMI). Since these problems are computationally hard to solve, they are transformed into problems with linear matrix inequalities (LMI), which are considered by many as easier to solve. However, the state-of-the-art LMI solvers often perform unreliably and can fail to find solutions even for low-dimensional systems. In fact, the inventors themselves had several unsuccessful attempts at designing/using output feedback controllers using several LMI formulations. This led the inventors to use of a convergent iterative algorithm, which worked reliably even for high-dimensional systems. One reason for this reliability is that instead of solving LMIs the convergent iterative algorithm may be chosen to reduce the necessary and sufficient conditions for static output feedback stabilizability to a set of Lyapunov equations and solves them iteratively to find static output feedback controllers. The following describes an example of such a convergent iterative algorithm.

Consider a continuous time-invariant system:

$$\dot{x} = Ax + Bu$$

$$y = Cx \qquad \text{Eq. (1)}$$

where $x \in \mathbb{R}^{n \times 1}$ is the state vector, $u \in \mathbb{R}^{m \times 1}$ is the control input vector and, $y \in \mathbb{R}^{p \times 1}$ is the output vector with $p < n$ and rank $(C) = p$. Moreover, the expected value $E[x(0)x(0)^T] = X > 0$ where X is a positive definite matrix. The goal with static output feedback control is to find a time-invariant output feedback gain matrix $F \in \mathbb{R}^{m \times p}$ such that $u = -F_y$ stabilizes the system in Eq. 1.

For a given output feedback gain matrix, $F \in \mathbb{R}^{m \times p}$, its resulting state feedback gain matrix is given by $K = FC \in \mathbb{R}^{m \times n}$. Alternatively, given a state feedback gain matrix $K \in \mathbb{R}^{m \times p}$ that stabilizes the system in Eq. 1, one can derive an output feedback controller as:

$$F = KC^\dagger \qquad \text{Eq. (2)}$$

where $C^\dagger \in \mathbb{R}^{n \times p}$ is the Moore-Penrose psuedoinverse of the output matrix $C \in \mathbb{R}^{p \times n}$. In order for the output feedback gain matrix in Eq. 2 to stabilize the system in Eq. 1, A-BFC must be stable. It is important to note that all stabilizing state feedback gains K do not result in stabilizing output feedback gains F given by Eq. 2.

Given below is an analysis of the closed-loop matrix A–BFC. The singular value decomposition of the output matrix C gives $C = USV^T$, where $U \in \mathbb{R}^{p \times p}$, $V \in \mathbb{R}^{n \times n}$ are unitary matrices such that $U^T U = UU^T = I_p$ and $V^T V = VV^T = I_n$, and $S \in \mathbb{R}^{p \times n}$ is a rectangular diagonal matrix containing the singular values of C. Here $I_p$, $I_n$ are $p \times p$ and $n \times n$ identity matrices, respectively. Moreover, $V = [V_1 \ V_2]$, $V_1 \in \mathbb{R}^{n \times p(n-p)}$ and $V_2 \in \mathbb{R}^{n \times (n-p)}$. Using this, we get:

$$A - BFC = A - BKC^\dagger C \qquad \text{Eq. (3)}$$

$$= A = BKVS^\dagger U^T USV^T$$

$$= V(V^T AV - V^T BKVS^\dagger S)V^T$$

$$= V\left(\hat{A} - \hat{B}[\hat{K}_1 \ \hat{K}_2]\begin{bmatrix} I_p & 0 \\ 0 & 0 \end{bmatrix}\right)V^T$$

where, $\hat{A} = V^T AV$, $\hat{B} = V^T B$, $\hat{K}_1 = KV_1$, $\hat{K}_2 = KV_2$, and $I_p \in \mathbb{R}^{p \times p}$ is the identity matrix. From Eq. 3, one can observe that $\hat{K}_2$ will be lost, and, in order to avoid this information loss, one needs to impose the constraint $\hat{K}_2 = 0$, i.e., $KV_2, = 0 \in \mathbb{R}^{m \times (n-p)}$.

Therefore, the static output feedback stabilization problem for the system in Eq. 1 can be formulated as the following constrained optimization problem of finding a state feedback gain K:

minimize $E[\int_0^\infty (x^T Qx + u^T Ru)dt]$, subject to $KV_2 = 0$, $Q \geq 0, R > 0,$ \qquad Eq. (4)

where, $u = -Kx$, and $Q \in \mathbb{R}^{m \times n}$ and $R \in \mathbb{R}^{m \times m}$ are positive-semidefinite and positive-definite matrices, respectively. Theorem 1 below presents the conditions satisfying which the stabilizing state feedback gain K forms the optimal solution to Eq. 4 and will result in a stabilizing output feedback gain F given by Eq. 2.

Theorem 1. Suppose the system in Eq. 1 is static output feedback stabilizable and detectable. There exists a static stabilizing output feedback gain $F = KC^\dagger$, if there exists a static stabilizing state feedback gain K that satisfies:

$$(A-BK)Y + Y(A-BK)^T + X = 0, \qquad \text{Eq. (5)}$$

$$(A-BK)^T P + P(A-BK) + K^T RK + Q = 0, \qquad \text{Eq. (6)}$$

$$K - R^{-1} B^T P[I - V_2(V_2^T Y^{-1} V_2)^{-1} V_2^T Y^{-1}] = 0 \qquad \text{Eq. (7)}$$

where $Y \in \mathbb{R}^{n \times n}$ and $P \in \mathbb{R}^{n \times n}$ are symmetric, positive-definite matrices, i.e., $Y = Y^T > 0$, $P = P^T > 0$.

The following Algorithm 1 presents a useful iterative convergent algorithm (e.g., a known technique for providing an output feedback controller used by the inventors for the particular application described herein that can stabilize a flat board and also a wide range of bongo boards and other dynamic, unstable environments), which uses Eq. 5-7 to find the optimal state feedback gain K that solves the constrained optimization problem in Eq. 4. The algorithm solves the algebraic Riccati equation in Eq. 8 to get the initial stabilizing state feedback gain $K_0$ (Step 3) that stabilizes the system in Eq. 1. At every iteration, the algorithm solves Lyapunov equations in Eq. 5 and 6 and uses Eq. 7 to update the state feedback gain such that $K_{i+1}$ in Eq. 9 stabilizes the system in Eq. 1 and $K_{i+1}V_2 \to 0$ as $i \to \infty$. The algorithm iterates until $\|K_{i+1}V_2\| > \epsilon$ (Step 5), and the norm can be either $L_2$-norm or Frobenius norm. Intuitively, at each iteration i, Algorithm 1 finds a state feedback gain $K_i$ that stabilizes the system in Eq. 1, and, as $i \to \infty$, it asymptotically tends to impose the constraint of $K_iV_2=0$ so that the corresponding output feedback gain $F_i$ from Eq. 2 stabilizes the system in Eq. 1.

---

Algorithm 1: Convergent Algorithm, for Output Feedback Control Design

Input : System {A, B, C}
       Matrices Q, R, X
output : Output Feedback Control Gain F
function: F = Output Feedback (A, B, C, Q, R, X)
begin
    Do singular value decomposition of C and obtain $V_2$
    [U, S, V]= svd(C)
    $V_2 = V(:,p + 1 : n)$
    Solve algebraic Riccati equation and obtain the initial gain
    $A^T N = NA - NBR^{-1}B^T N + Q = 0$
    $K_O = B^T N$                                     Eq. (8)
    where $Q \geq 0, R > 0$
    i = 0
    while $\|K_i V_2\| \geq \epsilon$ do
        Solve Lyapunov equations in Eq. 5 and 6 to get $Y_i$ and $P_i$
        $(A - BK_i)Y_i + Y_i(A - BK_i)^T + X = 0$
        $(A - BK_i)^T P_i + P_i(A - BK_i) + K_i^T RK_i + Q = 0$
        Get the gain increment from Eq. 7
        $K'_i = R^{-1}B^T P[1 - V_2 (V_2^T Y^{-1} V_2)^{-1} V_2^T Y^{-1}]$
        $\Delta K_i = K'_i + K_i$
        Update the gain
        $K_{i+1} = K_i + \beta_i \Delta K_i$                   Eq. (9)
        where $\beta_i > 0$ is chosen such that $A - BK_{i+1}$ is asymptotically stable
        i = i + 1
    end
    Get the output feedback gain $F = K_i C^\dagger$ (Eq. 2)
end

---

For all results presented in this description, in Step 5 of Algorithm 1, the Frobenius norm is used, and $\epsilon$ is chosen to be $10^{-5}$. The bounds on $\beta_i$ that guarantee both stability of the closed loop system and the convergence of Algorithm 1 along with proof of its convergence can be found in readily available literature. However, in the inventors' implementation, the parameter $\beta_i$ in Step 8 starts with a value of 0.1 for each iteration and is reduced by factors of 10 if the resulting closed-loop system is unstable. This is computationally cheap and allows Algorithm 1 to converge faster.

It is important to note that Algorithm 1 requires the number of outputs to be fewer than the number of states, i.e., p<n, and the output matrix $C \in \mathbb{R}^{p \times n}$ must be of full row rank, i.e., rank(C)=p. Moreover, for all results presented herein, the matrices X, R are chosen to be identity matrices, i.e., $X=I_n$ and $R=I_m$. Therefore, for all the described results, the only free, tunable parameter in Algorithm 1 is the state gain matrix $Q \in \mathbb{R}^{n \times n}$.

In this regard and significant to the present invention, the discussion of the universal balancing controller provided below presents an algorithm to automatically tune the Q matrix for ouput feedback control design. However, prior to turning to the universal controller, the following paragraphs describe a planar bipedal robot model utilized by the inventors in generating the controller. This discussion also teaches a derivation of equations of motion for this robot model while balancing in different dynamic and unstable environments such as when placed on or supported by a bongo board or a seesaw.

With regard to use of a planar bipedal robot, the inventors' work described herein focuses, at least in part, on lateral balancing tasks. Hence, the planar bipedal robot model is limited to the coronal plane of a bipedal robot. The planar bipedal robot is modeled as a four-bar linkage with four actuators corresponding to ankle and hip torques. This parallel mechanism (e.g., see FIGS. 2A-2D) has three constraints (two position constraints and one angle) constraint at the pelvis) and, hence, has only a single degree of freedom (DOF).

With regard to balancing a planar bipedal robot on a bongo board, the bongo board is modeled as a board on top of a rigid cylindrical wheel, and it has 2 DOF. The planar bipedal robot, which is modeled as a four-bar linkage, is assumed to be rigidly attached to the upper surface of the board such that the feet cannot slide or lose contact. In total, the model of the planar bipedal robot on the bongo board has 3 DOF. The model also assumes that there is no slip either between the wheel and the board or between the wheel and the floor. Moreover, the event of the board (e.g., its opposite ends) hitting the floor is ignored.

Figure 3:
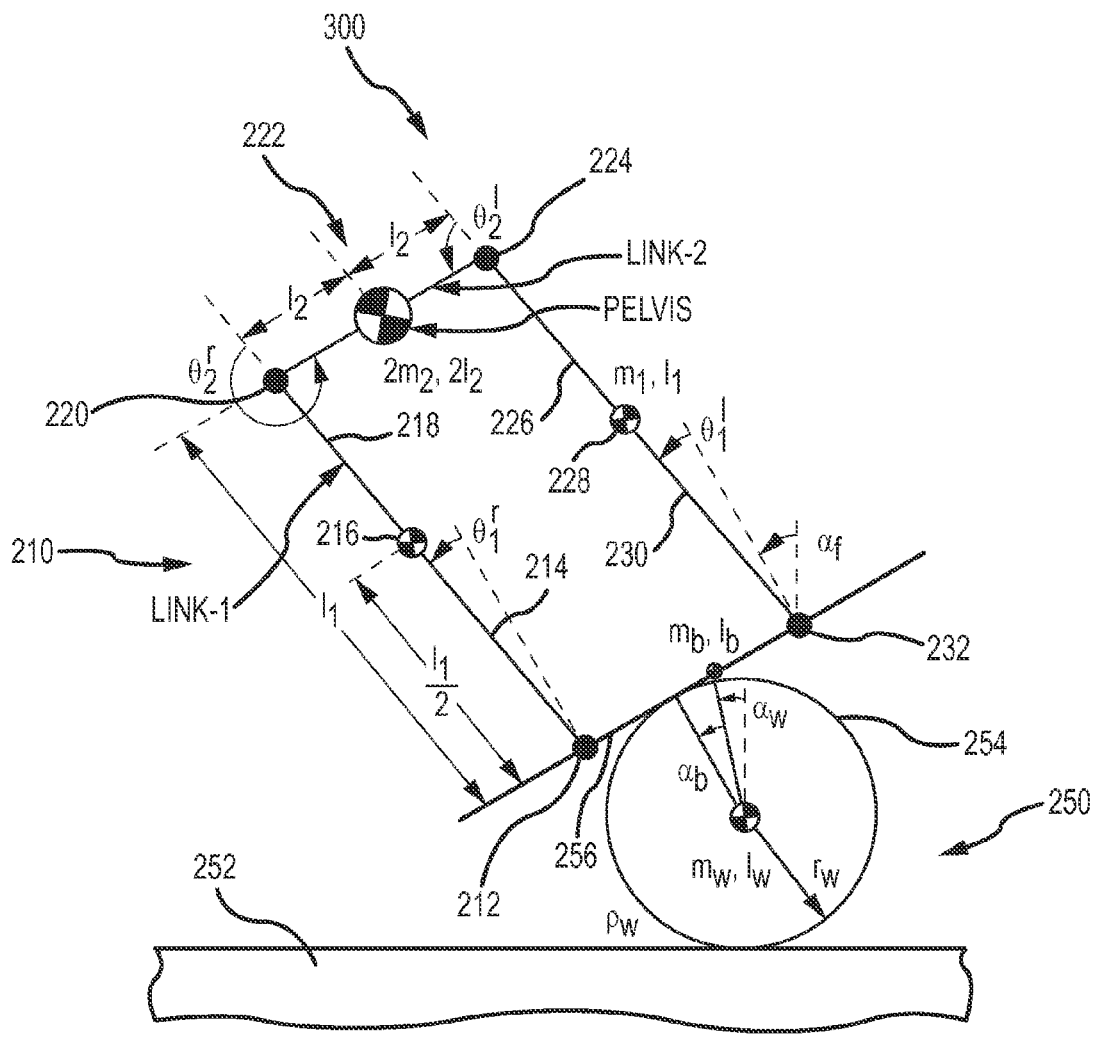
FIG. 3 illustrates the bongo board dynamic model of FIG. 2B with additional detail and labeling of parameters or characteristics used in modeling of a planar bipedal robot on a bongo board.

FIG. 3 illustrates a bongo board dynamic model 300 and includes components shown in FIG. 2B (with like numbering) along with additional labeling of features and characteristics of the model 300 to clarify the description of modeling techniques. FIG. 3 shows the configurations of the robot 210 on the bongo board 256, and the configuration vector is given by $q=[\alpha_w, \alpha_b, \theta_1^l \theta_1^r \theta_2^l \theta_2^r]^T \in \mathbb{R}^{6 \times 1}$, where $\alpha_w$ is the configuration of the wheel/cylinder, $\alpha_b$ is the configuration of the board, $\theta_1^l, \theta_1^r$ are the link-1 configurations of the left and right legs, respectively, and $\theta_2^l, \theta_2^r$ are the link-2 configurations of the left and right legs, respectively. The equations of motion are derived using Euler-Lagrange equations and can be written in matrix form as follows:

$$M(q)\ddot{q}+C(q,\dot{q})\dot{q}+G(q)=s^T\tau+\psi(q)^T\lambda \qquad \text{Eq. (10)}$$

where $M(q) \in \mathbb{R}^{6 \times 6}$ is the mass/inertia matrix, $C(q,\dot{q}) \in \mathbb{R}^{6 \times 6}$ is the matrix of Coriolis and centrifugal forces, $G(q) \in \mathbb{R}^{6 \times 1}$ is the vector of gravitational forces, $s=[0_{4 \times 2} I_4] \in \mathbb{R}^{4 \times 6}$ is the input coupling matrix, $I_4 \in \mathbb{R}^{4 \times 4}$ is the identity matrix, $\tau \in \mathbb{R}^{4 \times 1}$ is the vector of actuator inputs, $\psi(q) \in \mathbb{R}^{3 \times 6}$ is the constraint matrix, and $\lambda \in \mathbb{R}^{3 \times 1}$ is the vector of Lagrange mulitpliers. The constraints given by $\psi(q)\dot{q}=0 \in \mathbb{R}^{3 \times 1}$ are differentiated to get:

$$\psi(q)\ddot{q}+\dot{\psi}(q,\dot{q})\dot{q}=0 \in \mathbb{R}^{3 \times 1} \qquad \text{Eq. (11)}$$

The system matrices in Eq. 10 have long symbolic expressions and are not presented in this description.

In the rest of this description, the functional dependence of the terms on q and 4 are ignored for the ease of notation. Since the mass/inertia matrix M is always a symmetric, positive-definite matrix, it is always invertible. Therefore from Eq. 10:

$$\ddot{q}=M^{-1}(s^T\tau-C\dot{q}-G)+M^{-1}\psi^T\lambda \qquad \text{Eq. (12)}$$

Solving for $\lambda$ from Eq. 11 and Eq. 12:

$$\lambda=-(\psi M^{-1}\psi^T)^{-1}(\dot{\psi}\dot{q}+\psi M^{-1}(s^T\tau-C\dot{q}+G)) \qquad \text{Eq. (13)}$$

and combining Eq. 12 and Eq. 13, $\ddot{q}$ can be written as:

$$\ddot{q} = M^{-1}(N_2(s^T\tau - C\dot{q} - G) - N_1\dot{\psi}\dot{q}), \qquad \text{Eq. (14)}$$
$$= \Phi(q, \dot{q}, \tau)$$

where $N_1=\psi^T(\psi M^{-1}\psi^T)^{-1}$, $N_2=(I_6-N_1\psi M^{-1})$, and $I_6 \in \mathbb{R}^{6 \times 6}$ is the identity matrix.

The state vector of the system is given by $x=[q^T, \dot{q}^T]^T \in \mathbb{R}^{12 \times 1}$, and the linear state space matrices about its unstable equilibrium can be derived from Eq. 14 as follows:

$$A = \begin{bmatrix} 0_{6\times 6} & I_6 \\ \frac{\partial \Phi}{\partial q} & \frac{\partial \Phi}{\partial \dot{q}} \end{bmatrix}\Bigg|_{x=0,\tau=0} \in \mathbb{R}^{12\times 12}, \quad \text{Eq. (15)}$$

$$B = \begin{bmatrix} 0_{6\times 4} \\ \frac{\partial \Phi}{\partial \tau} \end{bmatrix}\Bigg|_{x=0,\tau,\tau=0} \in \mathbb{R}^{12\times 4}$$

However, the pair (A, B) in Eq. 15 is not controllable because it is not in its minimal realization. Given an output matrix $C \in \mathbb{R}^{p\times 12}$, where rank(C)=p, the state space realization {A, B, C} can be converted into its minimal realization {$A_m$, $B_m$, $C_m$} using Kalman decomposition, which provides an orthonormal state transformation matrix $U_m \in \mathbb{R}^{6\times 12}$ such that:

$$A_m = U_m A U_m^T \in \mathbb{R}^{6\times 6},$$

$$B_m = U_m B \in \mathbb{R}^{6\times 4},$$

$$C_m = C U_m^T \in \mathbb{R}^{p\times 6} \quad \text{Eq. (16)}$$

Here, six out of twelve states corresponding to the three constraints have been removed to obtain the minimal system with six states shown in Eq. 16. The nominal system parameters for the bongo board model used in the examples provided herein are provided in the following Table 1.

TABLE I

Nominal System Parameters for the Bongo Board Model

| Parameter | Symbol | Value |
|---|---|---|
| Wheel Density | $\rho_\omega$ | 200 kg·m$^{-3}$ |
| Wheel Radius | $r_\omega$ | 0.1 m |
| Wheel Mass | $m_\omega$ | 6.28 kg |
| Wheel Moment of Inertia | $I_\omega$ | 0.035 kg·m$^2$ |
| Board Mass | $m_b$ | 2 kg |
| Board Moment of Inertia | $I_b$ | 0.1067 kg·m$^2$ |
| Board Length | $l_b$ | 0.8 m |
| Link-1 Mass | $m_1$ | 15 kg |
| Link-1 Moment of Inertia | $I_1$ | 1 kg·m$^2$ |
| Link-1 Length | $l_1$ | 1 m |
| Link-1 Half Mass | $m_2$ | 15 kg |
| Link-2 Half Moment of Inertia | $I_2$ | 2 kg·m$^2$ |
| Link-2 Half Length | $l_2$ | 0.1 m |

With regard to a planar bipedal robot on a seesaw, the model of the planar bipedal robot on a seesaw (as shown in FIG. 2A) has only 2 DOF, one each for the planar bipedal robot and the seesaw (dynamic, unstable environment of this model). The derivation of the seesaw model is similar to that of the bongo board model, with the wheel configuration $\alpha_w$ being omitted and the board being attached to the floor at its center via a hinge joint. The seesaw model also may be designed to assume that the robot's feet are rigidly attached to the board (upper surface of the seesaw plank or planar board) such that they do not slide or lose contact.

With regard to a planar bipedal robot in static environments, the model of the planar bipedal robot balancing on a flat, non-level floor (see FIG. 2D) can be derived as a special case of the seesaw model with a non-zero board angle $\alpha_b$ and a board with a large mass $m_b$ and moment of inertia $I_b$. Similarly, the model of the planar bipedal robot on the board balancing on a curved floor can be derived as a special case of the bongo board model with a large wheel radius $r_w$, mass $m_w$, and moment of inertia $I_w$. The model of the planar bipedal robot on a flat, non-level floor has 1 DOF, while that on a curved floor (see FIG. 2C) has 2 DOF.

It is important to understand that with the inventors' universal balancing controller that environment data is not essential for achieving balance. The following discussion validates this hypothesis, i.e., that environment data is not essential to stabilize bipedal robots in dynamic and unstable environments like a seesaw and a bongo board. Particularly, it will be shown that the balancing controller does not need measurements and/or estimations of what is under the robot's feet, e.g., the wheel angle $\alpha_w$ and the board angle $\alpha_b$, for a successful balancing operation as long as global robot data is available.

More specifically, Algorithm 1 is used to design a static output feedback controller that uses just three sensor outputs (three pieces of global robot data) to successfully stabilize both the seesaw and bongo board models. The first two outputs are chosen to be the global position and velocity of the pelvis, which may be calculated using the left link-1 and link-2 angles and angular velocities, respectively. The third output is chosen to be the robot's right link-1 angle. The output matrix $C \in \mathbb{R}^{3\times 12}$ for the bongo board model can then be written as:

$$C = [C_1 C_2], \quad \text{Eq. (17)}$$

where, $$C_1 = \begin{bmatrix} -l_1-l_2-2r_w & -l_1-l_2 & -l_1-l_2 & 0 & -l_2 & 0 \\ 0 & 0 & 0 & 0 & 0 & 0 \\ 0 & 0 & 0 & 1 & 0 & 0 \end{bmatrix} \quad \text{Eq. (18)}$$

$$C_2 = \begin{bmatrix} 0 & 0 & 0 & 0 & 0 & 0 \\ -l_1-l_2-2r_w & -l_1-l_2 & -l_1-l_2 & 0 & -l_2 & 0 \\ 0 & 0 & 0 & 0 & 0 & 0 \end{bmatrix} \quad \text{Eq. (19)}$$

where the system parameters are provided in Table I. It is assumed that the global position and velocity of the pelvis are obtained using an inertial measurement unit at the pelvis. The output matrix for the seesaw model $C \in \mathbb{R}^{3\times 10}$ can be similarly derived. It is important to note that though the bongo board and seesaw models have different dimensional state spaces, i.e., twelve and ten, respectively, their respective chosen outputs are the same both in number, i.e., three, and in what they represent.

Figure 4:
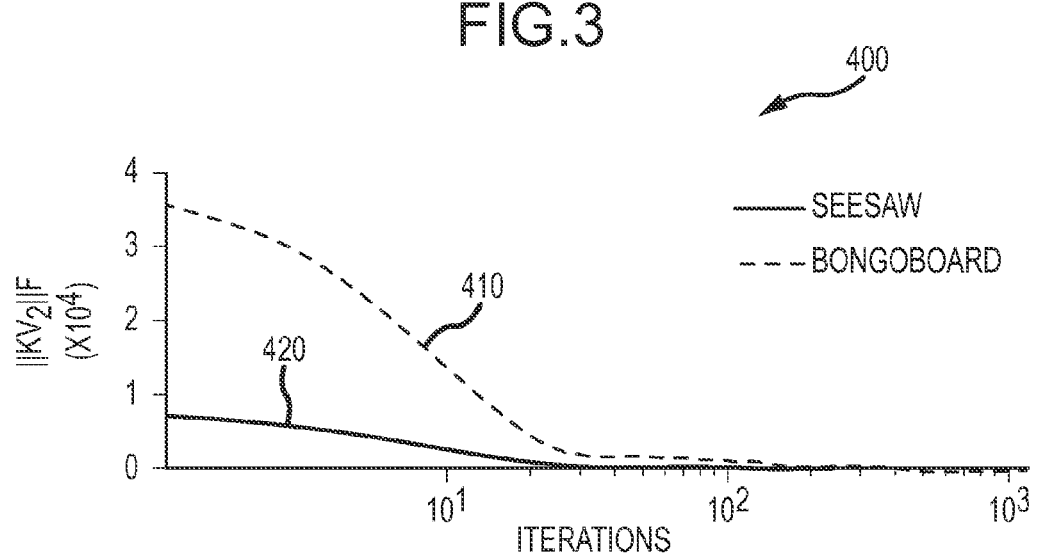
FIG. 4 is a graph plotting analysis results for seesaw and bongo board models with static output feedback.
Figure 5A:
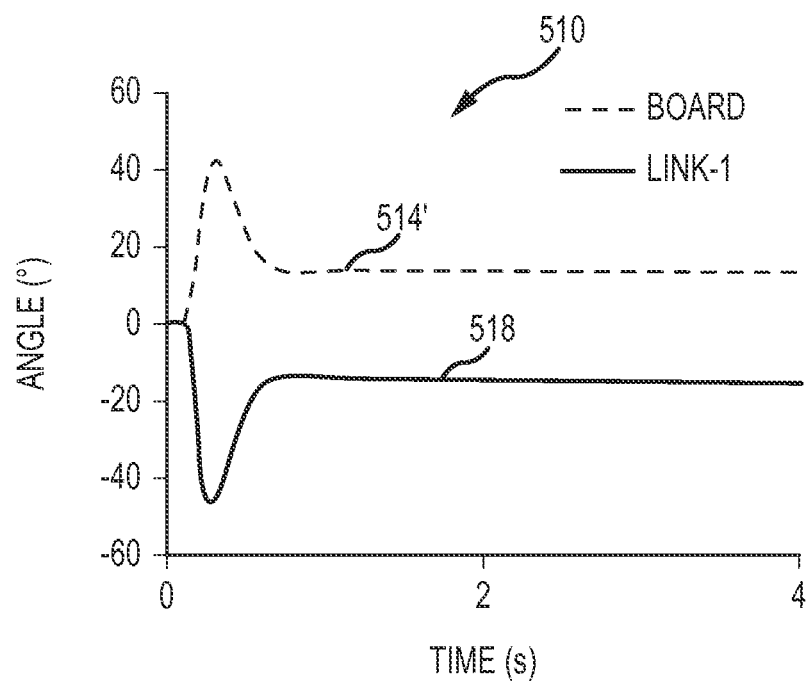
FIGS. 5A and 5B provide graphs that plot global board and left link-1 angle trajectories for a seesaw and a bongo board, respectively, under disturbance as being stabilized with a universal balance controller of the present description.
Figure 5B:
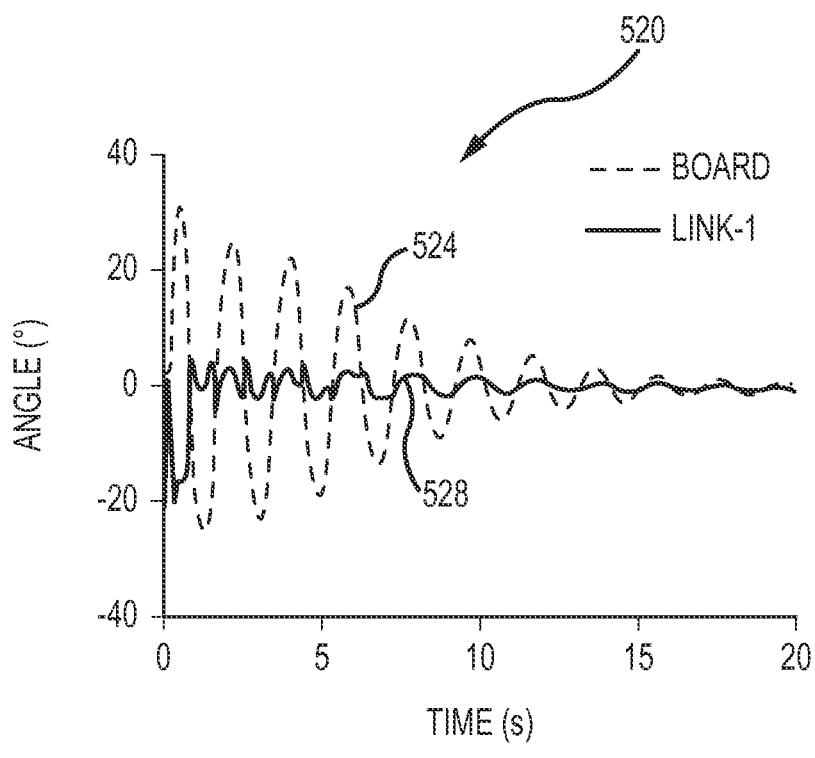

FIG. 4 provides a graph 400 showing a semi-logarithmic plot of the convergence of the Frobenius norm $\|KV_2\|_F$ to zero for seesaw and bongo board models, with lines 410, 420, provided with a static output feedback control based on Algorithm 1. The plot 400 of the Frobenius norm $\|KV_2\|_F$ is generated using increasing iterations of the Algorithm 1 for both the bongo board model (line 410) and the seesaw model (line 420) with three outputs (sensor outputs from the modeled robot). It can be seen that $\|KV_2\|_F$ converges to zero for both the models indicating the existence of output feedback controllers that can stabilize both the bongo board and seesaw models with only three outputs as shown in Eq. 17-19. It is useful to note that at iteration i of Algorithm 1, the state feedback gain $K_i$ stabilizes the system in Eq. 1. Further, as $i \to \infty$, $K_i V_2 \to 0$ and the state feedback gain $K_i$ takes the structure of output feedback. Hence, the final output feedback gain F given by Eq. 2 successfully stabilizes the system in Eq. 1. Although the invention has been described and illustrated with a certain degree of particularity, it is understood that the present disclosure has been made only by way of example, and that numerous changes in the combination and arrange- FIGS. 5A and 5B show graphs 510, 520 for control of a bipedal planar robot modeled in a seesaw environment and a bongo board environment, respectively (with $r_w$ equal to 0.1 meters), showing global board angle trajectories (with lines 514 and 524) and link-1 angle trajectories (with lines 518 and 528). The graphs 510, 520 plot these trajectories when the controlled models have their nonlinear equations of motion simulated under the action of the output feedback controller (derived as shown above) while subjected to a disturbance, i.e., 70 nm on the board for 0.1 seconds. It is interesting to note from FIG. 5A that the output feedback controller successfully stabilizes the seesaw but has a steady state error, whereas the corresponding output feedback controller for the bongo board model successfully stabilizes the system to zero board angle as shown in FIG. 5B.

At this point in the description, it may be useful to turn to a more detailed and full discussion of an exemplary universal balancing controller (or more simply "universal controller") for use in stabilizing and/or balancing a bipedal robot on a variety of differing supports or environments. The prior discussion was useful for showing that the bongo board model has 3 DOF (6 minimal states), while the seesaw and curved floor models have 2 DOF (4 minimal states) and the flat floor model has 1 DOF (2 minimal states). Although these models have state spaces with different dimensions, the dimensions of their input spaces are the same, i.e., four actuators at hip and ankle joints. In order to design a single, universal controller that stabilizes the robot in these different dynamic and static environments, the universal controller should be adapted to map the same entities to the same control inputs of the robot. Since the state space for each case is of a different dimension, the universal controller cannot be a state feedback controller. The following discussion, therefore, proposes a design for a universal controller as or as including an output feedback controller, which maps the same outputs from each of these cases to the same control inputs of the robot.

The above discussion also showed that the bongo board and seesaw models are output feedback stabilizable and further that three outputs are sufficient to stabilize the system via output feedback. However, the larger the number of independent outputs the better is the control authority, and, hence, the universal controller described herein uses (in some embodiments) five outputs (from sensors on the robot) for feedback. The first two outputs are chosen to be the global position and velocity of the pelvis measured using the left link-1 and link-2 angles and angular velocities, respectively. The next three outputs are chosen to be the right link-1 angle, angular velocity, and the global foot angle. It is useful to note that the outputs do not include direct measurements of the wheel angle $\alpha_w$ and board angle $\alpha_b$. The global foot angle and global position and velocity of the pelvis can be measured using an inertial measurement unit (IMU) at the pelvis. The output matrix $C \in \mathbb{R}^{5 \times 12}$ for the bongo board model can be written as:

$$C = [C_1 C_2] \quad \text{Eq. (20)}$$

where, $$C_1 = \begin{bmatrix} -l_1 - l_2 - 2r_w & -l_1 - l_2 & -l_1 - l_2 & 0 & -l_2 & 0 \\ 0 & 0 & 0 & 0 & 0 & 0 \\ 0 & 0 & 0 & 1 & 0 & 0 \\ 0 & 0 & 0 & 0 & 0 & 0 \\ 1 & 1 & 0 & 0 & 0 & 0 \end{bmatrix} \quad \text{Eq. (21)}$$

$$C_2 = \begin{bmatrix} 0 & 0 & 0 & 0 & 0 & 0 \\ -l_1 - l_2 - 2r_w & -l_1 - l_2 & -l_1 - l_2 & 0 & -l_2 & 0 \\ 0 & 0 & 0 & 0 & 0 & 0 \\ 0 & 0 & 0 & 1 & 0 & 0 \\ 0 & 0 & 0 & 0 & 0 & 0 \end{bmatrix} \quad \text{Eq. (22)}$$

The output matrix for the seesaw model $C \in \mathbb{R}^{5 \times 10}$ can be similarly derived.

The reader may wonder why the inventors picked five outputs and not more. One reason has to do with the applicability of Algorithm 1, in which the number of outputs is less than the number of minimal states. The bongo board model is the most generic model among those discussed herein, and it has six minimal states. Therefore, Algorithm 1 limits analysis to use of five outputs. The prior discussion also derived individual output feedback controllers for the seesaw and bongo board models using Algorithm 1. However, in order to derive a universal controller, the following discussion derives an output feedback controller for the bongo board model, and, since this is the most generic model, the same controller also will stabilize the other models discussed in this description.

With regard to optimizing the range of universality, the inventors understood that the seesaw model can be represented as a bongo board model with zero wheel radius, i.e., $r_w = 0$. Then, by keeping the density of the wheel of the bongo board model constant, the curved floor model can be represented as a bongo board model with large wheel radius and, thereby, large wheel mass and moment of inertia. The flat floor model can be represented as a bongo board model with infinite wheel radius, i.e., $r_w = \infty$. Therefore, the bongo board model can be considered as a generic model that in the linear range of wheel radius $r_w = [0, \infty]$ can represent seesaw, family of bongo board, curved floor, and flat floor models.

The user-defined matrices that affect the output feedback controller design using Algorithm 1 are Q, R, and X. The matrices R and X are chosen to be identity matrices, and, hence, only the elements of Q affect the output feedback controller from Algorithm 1. The following discussion presents an optimization algorithm that optimizes for the elements of the Q matrix such that the resulting output feedback controller stabilizes the seesaw and flat floor models and also stabilizes the largest family of bongo board models, i.e., the largest range of wheel radii.

Particularly, $Q \in \mathbb{R}^{12 \times 12}$ for the bongo board model is chosen to be a diagonal matrix, with equal weights for the configurations of the left and right legs. Therefore, the matrix $Q \in \mathbb{R}^{12 \times 12}$ is parameterized by eight parameters as follows:

$$Q = \text{diag}([a_1, a_2, a_3, a_3, a_4, a_4, a_5, a_7, a_8, a_8]^T) \quad \text{Eq. (23)}$$

and the matrix $Q_m \in \mathbb{R}^{6 \times 6}$ corresponding to the minimal system $\{A_m, B_m, C_m\}$ in Eq. 16 is obtained as $Q_m = U_m Q U_m^T$. As mentioned earlier, the user-defined matrices include $R_m = I_4$ and $X_m = I_6$. It should be noted that the planar robot model discussed above has four inputs, and the output feedback controller feeds back five outputs as shown in Eq. 20. For a given $Q_m$, the output feedback control gain $F \in \mathbb{R}^{4 \times 5}$ is obtained using OutputFeedback($A_m, B_m, C_m, Q_m, R_m, X_m$) in Algorithm 1. It is also important to note that the output feedback control gain $F \in \mathbb{R}^{4 \times 5}$ can be used for output feedback control of the different dynamic systems considered herein since they all have the same five outputs.

The problem of finding the universal controller can be formulated as an optimization problem of finding the eight parameters $\{a_i\}$ of Q in Eq. 23 such that the resulting output feedback controller stabilizes the seesaw and flat floor models. The controller also stabilizes the largest family of bongo board models, i.e., the largest range of wheel radii. The optimization problem is formulated as follows:

$$\underset{\{a_i\}}{\text{minimize}}\, J = w_1 J_1 + w_2 J_2 + w_3 J_3 + w_4 J_4 + w_5 J_5 \quad \text{Eq. (24)}$$

where, $w_1$–$w_5$ are user-defined weights, Eq. (25)

$$J_1 = \begin{cases} 1 & \text{when } F \text{ fails on flat floor model} \\ 0 & \text{when } F \text{ stabilizes flat floor model} \end{cases}$$

$$J_2 = \begin{cases} 1 & \text{when } F \text{ fails on seesaw model} \\ 0 & \text{when } F \text{ stabilizes seesaw model} \end{cases} \quad \text{Eq. (26)}$$

$$J_3 = \frac{r_{low}}{r_{min}}, \quad \text{Eq. (27)}$$

$$J_4 = \frac{r_{max}}{r_{up}}, \quad \text{Eq. (28)}$$

$$J_5 = \|G^d\|_\infty \quad \text{Eq. (29)}$$

where F is the output feedback gain derived for the nominal bongo board model using Algorithm 1 with the chosen Q at each iteration, $r_{low}, r_{up}$ are the lower and upper bounds, respectively, of the range of stabilizable wheel radii for the bongo board models, $r_{min}, r_{max}$ are the minimum and maximum bounds, respectively, of the range of wheel radii for which the output feedback gain F is evaluated, and $G^d$ is the transfer function from the disturbance torque on the board to the outputs of the nominal closed loop system with output feedback gain F.

The term $J_5$ in Eq. 29 is used to ensure that the disturbance rejection of the nominal closed loop system with the output feedback controller is not compromised in an attempt at enlarging the range of stabilizable wheel radii. Large values are chosen for the weights $w_1$ and $w_2$ in order to drive the optimization towards finding output feedback gains that stabilize the seesaw and flat floor models. The $w_3$-$w_5$ determine the relative weightage between the lower and upper bounds of stabilizable wheel radii and the $H_\infty$ norm of the controller's ability to reject disturbances.

Algorithm 2: Optimizing Output Feedback Gain

| | |
|---|---|
| input | Initial Parameters $\{a_i\}^0$ |
| | Weights $w_1, w_2, w_3, w_4, w_5$ |
| | Nominal Radius $r_{nom}$ |
| | Bounds $r_{min}, r_{max}$ |
| output | Optimized Parameters $\{a_i\}^*$ |
| | Optimal output feedback gain F* |
| function | $[\{a_i\}^*, F^*]$ = OptimizeOutputFeedback($\{a_i\}^0$) |
| begin | |
| | Get the state space matrices for the nominal system |
| | [A, B, C] = StatespaceBongoboard($r_{nom}$) |
| | Get the minimal realization of the nominal system |
| | $[A_m, B_m, C_m, U_m]$ = MinimalRealization (A, B, C) |
| | Choose matices $R_m, X_m$ for the minimal system |
| | $R_m = I_4, X_m = I_6$ |
| | Initialize the parameters of Q |
| | $\{a_i\} = \{a_i\}^0$ |
| repeat | |
| | Get the new Q and $Q_m$ matrices |
| | Q($\{a_i\}$) (Eq. 23) |
| | $Q_m = U_m Q U_m^T$ |
| | Get the output feedback gain for the nominal system |
| | F = OutputFeedback ($A_m, B_m, C_m, Q_m, R_m, X_m$) |
| | Evaluate stability of flat floor and seesaw models |
| | $J_1, J_2$ (Eqs. 25-26) |
| | Get the range of stabilizable wheel radii (Algorithm 3) |
| | $[r_{low}, r_{up}]$ = StabilizableRadii(F, $r_{nom}, r_{min}, r_{max}$) |

-continued

Algorithm 2: Optimizing Output Feedback Gain

| | |
|---|---|
| | $J_3 = \frac{r_{low}}{r_{min}}, J_4 = \frac{r_{max}}{r_{up}}$ (Eqs. 27-28) |
| | Get the disturbance $\infty$ – norm for the nominal closed loop system |
| | $J_5 = \|G^d\|_\infty$ (from Eq. 32) |
| | Get the overall cost function |
| | $\Delta J = w_1 J_1 + w_2 J_2 + w_3 J_3 + w_4 J_4 + w_5 J_5 - J$ |
| | $J = J + \Delta J$ |
| | Update the parameters of Q |
| | $\Delta\{a_i\}$ = OptimizerUpdate (J, $\{a_i\}$) |
| | $\{a_i\} = \{a_i\} + \Delta\{a_i\}$ |
| | until $\Delta J < \epsilon_J$ or $\Delta\{a_i\} < \epsilon_a$ |
| | Get the optimal parameters of Q and the optimal output feedback gain |
| | $\{a_i\}^* = \{a_i\}$ |
| | F* = F |
| end | |

The overall optimization algorithm is presented in preceding Algorithm 2. At each iteration, the algorithm computes $Q_m$ for the chosen parameters (Step 7) and computes the corresponding output feedback gain F (Step 8). The different cost functions $J_1$-$J_5$ whose weighted sum constitutes the overall cost function as shown in Eq. 24 are computed for this output feedback gain F (Steps 9-12), and the parameters of the Q matrix are updated accordingly (Step 13). This process continues until the desired convergence is achieved, and the optimal parameters $\{a_i\}^*$ of the Q matrix and the corresponding optimal output feedback gain F* is obtained (Step 15).

The following sections describe how terms from Eq. 27-29 (Steps 10-11 of Algorithm 2) are derived at each iteration of the optimization. First, with regard to finding the range of stabilizable wheel radii, Algorithm 3 (following this paragraph) uses a bisection algorithm to find the range of stabilizable wheel radii. At each iteration i, the linear state space matrices for the bongo board model with radius $r_i$ are computed (Steps 5 and 17) and their corresponding minimal system matrices are obtained using Kalman decomposition (Steps 6 and 18). Then, the closed loop stability of the linear minimal system with the output feedback gain F derived for the nominal system is evaluated, and the bounds are updated accordingly (Steps 7-12 and 19-24).

Algorithm 3: Find Range of Stabilizable Wheel Radii

| | |
|---|---|
| input | Output Feedback Gain F |
| | Nominal Radius $r_{nom}$ |
| | Bounds $r_{min}, r_{max}$ |
| output | Stabilize Range $r_{low}, r_{up}$ |
| function | $[r_{low}, r_{up}]$ = StabilizableRadii(F, $r_{nom}, r_{min}, r_{max}$) |
| begin | |
| | $r_{mid} = r_{nom}$ |
| | while ($r_{mid} - r_{min}$) > $\epsilon_r$ do |
| | Update the lower bound |
| | $r_{low} = \frac{1}{2}(r_{min} + r_{mid})$ |
| | Get the new state space matrices |
| | [A, B, C] = StatespaceBongoboard($r_{low}$) |
| | Get the minimal system |
| | $[A_m, B_m, C_m]$ = MinimalRealization(A, B, C) |
| | Get the set of unstable closed loops using output feedback. |
| | $p_{unstab} = \{\lambda_i \| \lambda_i \in \lambda(A_m - B_m F C_m) >= 0\}$ |
| | if $p_{unstab} \neq 0$ then |
| | $r_{min} = r_{low}$ |
| | else |
| | $r_{mid} = r_{low}$ |

Algorithm 3: Find Range of Stabilizable Wheel Radii

```
            end
        end
        r_mid = r_nom
        while (r_max - r_mid) > ε_r do
            Update the outer bound
```

$$r_{up} = \frac{1}{2}(r_{mid} + r_{max})$$

```
            Get the new state space matrices
                [A, B, C] = StatespaceBongoboard (r_up)
            Get the minimal system
                [A_m, B_m, C_m] = MinimalRealization(A, B, C)
            Get the set of unstable closed loops using output feedback
                p_unstab = {λ_i | λ_i ∈ λ(A_m − B_m FC_m) >= 0}
            if p_unstab ≠ 0 then
                r_max = r_up
            else
                r_mid = r_up
            end
        end
end
```

The work described herein assumes that the density of the wheel of the bongo board remains constant, and, hence, with changing wheel radii, the mass and moment of inertia of the wheel also changes. It also assumes that the wheel is a solid cylinder of unit length, and its mass and moment of inertia are given by:

$$m_w = \pi r_w^2 \rho_w,$$

$$I_w = \tfrac{1}{2}\pi r_w^4 \rho_w, \qquad \text{Eq. (30)}$$

Also, in this description, the minimum $r_{min}$ and maximum $r_{max}$ allowable wheel radii values for the bisection algorithm in Algorithm 3 are set to 0.001 meters and 122.7108 meters, respectively. With a constant wheel density of 200 kg·m$^{-3}$ (Table I), the minimum radium $r_{min}=0.001$ meters results in a wheel of mass $6.28\times10^{-1}$ kilograms and moment of inertia $3.24\times10^{-10}$ kg·m$^2$, and the maximum radius $r_{max}=122.7108$ meters results in a wheel of mass $9.46\times10^6$ kilograms and moment of inertia of $7.12\times10^{10}$ kg·m$^2$. In this description, the maximum radius is restricted to 122.7108 meters because, beyond this value, the reciprocal of the condition number of the mass/inertia matrix of the system becomes less than $10^{-12}$, and, hence, the mass/inertia matrix becomes too close to singular. As listed in Table I, the nominal radius for the bongo board model is $r_{nom}=0.1$ meters and the resulting mass is 6.28 kilograms and moment of inertia is 0.0314 kg·m$^2$.

From Eq. 30, one can see that with a constant wheel density $\rho_w$, a linear growth in the wheel radius $r_w$, results in a quadratic growth in the wheel mass $m_w$ and a quartic growth in the wheel moment of inertia $I_w$. Therefore, with sufficiently large radius, the mass and moment of inertia of the wheel are large enough that the wheel does not move and the system reduces to the robot balancing on a board on top of a curved floor. The wheel radii range of 0.001 meters to 122.7108 meters is sufficient to evaluate the stabilizable range of an output feedback controller, and any controller that can stabilize this wide family of bongo boards and curved floors (and also the seesaw and flat floor models) is worth enough to be called a universal controller.

Now, with regard to finding the $H_\infty$ norm for disturbance, in an attempt at increasing the range of stabilizable wheel radii for the universal controller, the controller's robustness to disturbances should not be compromised. Therefore, the objective function in Eq. 24 included a term $J_5$ for the $H_\infty$ norm of the transfer function of the closed loop system from the disturbance on the bongo board to the outputs of the system. This description focuses only on the disturbance torque subjected to the board for the nominal system.

Given the nominal system {A, B, C} and the output feedback gain F, the linear state space matrices of the closed loop system used for disturbance rejection analysis are as follows:

$$A^d = A - BFC \in \mathbb{R}^{12\times 12} \qquad \text{Eq. (31)}$$

$$B^d = \begin{bmatrix} 0_{6\times 4} \\ N_2 s_d^T \end{bmatrix}\bigg|_{q=0} \in \mathbb{R}^{12\times 4},$$

$$C^d = C \in \mathbb{R}^{5\times 12},$$

where $N_2 = M^{-1}(I_6 - N_1 \Psi M^{-1})$, $N_1 = \Psi^T(\Psi M^{-1}\Psi^T)^{-1}$, $s_d=[0, 1, 0, 0, 0, 0]$. Here the input is the disturbance torque to the board, and the outputs remain the same five outputs as that of the original nominal system in Eq. 20. The transfer function from the disturbance to the outputs can be written in matrix form as:

$$G^d \begin{bmatrix} A_m^d & B_m^d \\ C_m^d & 0_{5\times 1} \end{bmatrix}, \qquad \text{Eq. (32)}$$

where $\{A_m^d, B_m^d, C_m^d\}$ is the minimal realization of $A^d B^d C^d$ in Eq. 31. Algorithm 2 uses the $H_\infty$ norm of $G^d$ in Eq. 32 for computing $J_5$ (Step 11 of Algorithm 2).

The norm $\|G_d\|_\infty$ represents the sensitivity of the outputs of the closed loop system in Eq. 31 to the disturbance on the board. The lower the norm, the lower is the sensitivity and the more robust is the output feedback controller to the bongo board's disturbances. Hence, it is desirable to reduce $J_5 = \|G^d\|_\infty$ in the optimization in Algorithm 2.

At this point, it may be useful to provide a performance comparison and analysis for the universal controller. The following discussion presents a detailed analysis of the universal controller derived using Algorithm 2 and compares its performance and robustness with other controller like linear quadratic (LQR) and $H_\infty$ controllers. Particularly, with regard to the controllers under comparison, the discussion that follows presents the universal controller, the LQR controller, and the $H_\infty$ controller for comparison.

First, with regard to the universal controller, the optimal output feedback gain $F \in \mathbb{R}^{4\times 5}$ obtained using Algorithm 2 for the system with nominal parameters shown in Table I and the output matrix $C \in \mathbb{R}^{5\times 12}$ shown in Eq. 20 is given below.

$$F = 10^6 \times \begin{bmatrix} -2.7167 & -1.1894 & 0.9536 & 0.0101 & 0.7685 \\ -2.7167 & -1.1894 & 0.9536 & 0.0101 & 0.7685 \\ 2.7167 & 1.1894 & -0.9536 & -0.0101 & -0.7685 \\ 2.7167 & 1.1894 & -0.9536 & -0.0101 & -0.7685 \end{bmatrix} \qquad \text{Eq. (33)}$$

It can be seen from Eq. 33 that since the robot is a parallel mechanism with only one DOF, the actuation at the ankle and hip joints are duplicated. The left and right ankle torques are the same, while the left and right hip torques are equal in magnitude but opposite in sign to that of the ankle torques.

Second, with regard to the LQR controller, the LQR controller compared here is obtained by optimizing for the elements of its Q matrix using an algorithm similar to Algorithm 2 such that the objective function in Eq. 24 is minimized, and its R matrix is fixed to be an identity matrix. Just like Algorithm 2, the algorithm employed here is optimized for the elements of the Q matrix such that the range of stabilizable wheel radii for the resulting LQR controller is maximized. However, this algorithm ignored cost functions $J_1$ (Eq. 25) and $J_2$ (Eq. 26) since the state feedback LQR controller for the bongo board model cannot be used to stabilize flat floor and seesaw models with state spaces of different dimensions. Note, in the spirit of brevity, the elements of the derived LQR gain matrix are not provided here.

Third, with regard to the $H_\infty$ controller, a brief description of the structure of the $H_\infty$ controller with output feedback compared here is presented below. The linear, minimal state space equations used for $H_\infty$ control design are as follows:

$$\dot{x}_m = A_m x_m + B_m^d u_d + B_m u,$$

$$\tilde{y} = \tilde{C} x_m + \tilde{D} u_d,$$

$$y_m = C_m x_m \quad \text{Eq. (34)}$$

where $\{A_m, B_m, C_m\}$ is the linear, minimal statespace realization of the nominal bongo board model shown in Eq. 16, $B_m^d \in \mathbb{R}^{6 \times 1}$ is the minimal input transfer matrix corresponding to the disturbance input $u_d$ on the board as shown in Eq. 32, and $$\tilde{C} = \begin{bmatrix} \sqrt{U_m Q U_m^T} \\ 0_{4 \times 6} \end{bmatrix} \in \mathbb{R}^{10 \times 6}, \quad \text{Eq. (35)}$$

$$\tilde{D} = \begin{bmatrix} 0_{6 \times 4} \\ \sqrt{R} \end{bmatrix} \in \mathbb{R}^{10 \times 4}$$

where $\sqrt{(\cdot)}$ refers to the Cholesky factor of the corresponding matrix. The $H_\infty$ controller $K_\infty$ is a state space model with six states, five inputs ($y_m$) and four outputs (u), and is designed such that the $H^\infty$ norm of the transfer function from disturbance input $u_d$ to output $\tilde{y}$, i.e., $\|T_{\tilde{y} u_d}\|_\infty$, is minimized. It can be seen from Eq. 34 and 35 that the matrix Q affects the output $\tilde{y}$ of the system, which in turn affects the $H_\infty$ controller. Here, similar to the universal and LQR controllers, the elements of the Q matrix are optimized using an algorithm similar to Algorithm 2 such that the objective function in Eq. 24 is minimized.

With regard to universality and the range of stabilizable wheel radii, Table II (above) compares the performance of the different controllers described previously in stabilizing the flat floor, seesaw, and family of bongo board and curved floor models. The stabilizability guarantees were derived using linearized dynamics of the respective models about the unstable vertical equilibrium. As described earlier, the curved floor and flat floor models are derived as special cases of bongo board and seesaw models, respectively.

The LQR controller used in this comparison is a state feedback controller derived for the nominal bongo board model, and, hence, it cannot be used to stabilize the seesaw and flat floor models. However, since the $H_\infty$ controller presented is an output feedback controller, it can be used to stability the nominal seesaw and flat floor models. But, the best $H_\infty$ controller derived herein was unable to stabilize both these systems as shown in Table II. It is important to note that the universal controller was, in contrast, capable of stabilizing both the nominal seesaw and flat floor models.

For the family of bongo board and curved floor models, the range of stabilizable wheel radii for the LQR and $H_\infty$ controllers designed for the nominal bongo board model are evaluated using the bisection algorithm similar to Algorithm 3. It is also to be noted that the optimization algorithm similar to Algorithm 2 was used to tune the elements of the Q matrix for both these controllers, with R being fixed to an identity matrix. The best results of such optimization are reported in Table II. It is useful to note that the search space for stabilizable wheel radii (as noted above) was restricted to the range of 0.001 to 122.7108 meters for all the cases.

It can be seen from Table II that the universal controller presented herein, which was optimized using Algorithm 2, was able to stabilize the entire range of allowable wheel radii, i.e., 0.001 to 122.7108 meters, and was also able to successfully stabilize the planar robot on the nominal seesaw and flat floor models. This makes the output feedback controller a truly universal controller for the models considered in this description. However, the best range of stabilizable wheel radii that the optimized LQR controller could achieve was 0.0942 to 0.1257 meters, and the optimized $H_\infty$ controller with output feedback could stabilize a range of 0.0363 to 0.2798 meters. Hence, the $H_\infty$ controller performs significantly better than the LQR controller by stabilizing a wider range of wheel radii, but the universal controller performs orders of magnitude better than even the best performing $H_\infty$ controller.

TABLE II

Performance comparison with other control approaches

| Control Design | Stabilizes Seesaw ($r_w = 0$ m) | Stabilizes on Flat Floor ($r_w = \infty$ m) | Stabilizable Bongo Wheel Radii | | Disturbance Rejection (Nominal System) | |
|---|---|---|---|---|---|---|
| | | | Minimum ($r_{min} = 0.001$ m) | Maximum ($r_{max} = 122.7108$ m) | $\|G^d\|_\infty$ | Maximum Disturbance Torque for 0.1 s |
| LQR Control (state feedback) | N/A | N/A | 0.942 m | 0.1257 | 0.6676 | 31.2 |
| $H_\infty$ Control (output feedback) | No | No | 0.0363 | 0.2798 | 0.2105 | 36.2 |
| Universal Control (this description) | Yes | Yes | 0.001 m | 122.7108 m | 0.4448 | 86.7 |

With regard to disturbance rejection, Table II also compares the performance of the different controllers in rejecting the disturbance torques on the board. As discussed earlier, the $H_\infty$ norm of the transfer function given in Eq. 32 describes the sensitivity of the closed-loop system dynamics to the disturbance torque on the board. As shown in Table II, the best $H_\infty$ controller presented has a lower $\|G^d\|_\infty$ than that of the universal controller, which in turn has a lower value than that of the LQR controller.

Figure 6:
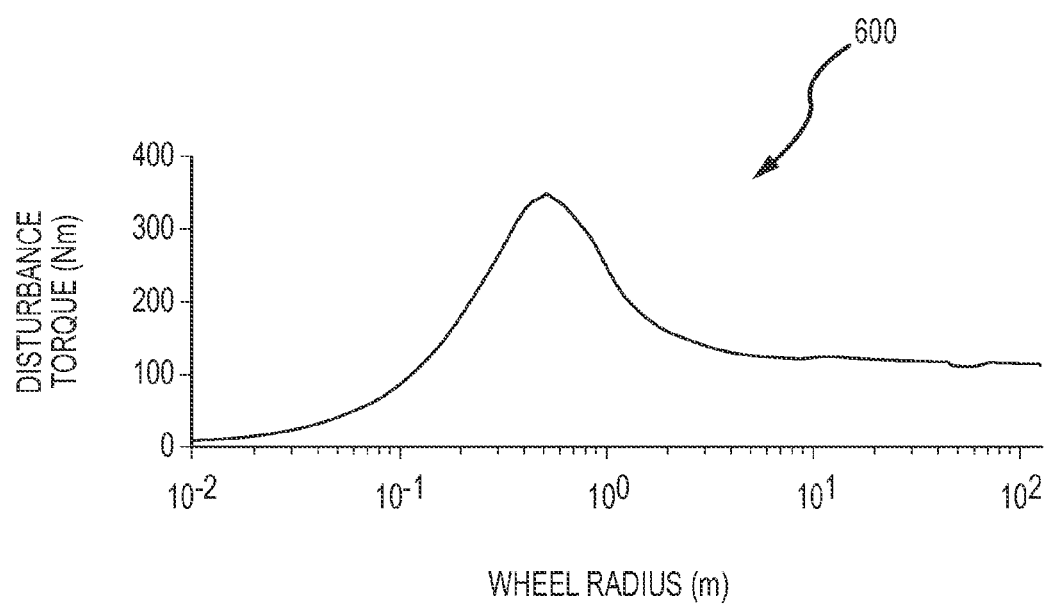
FIG. 6 is a semi-logarithmic plot of maximum disturbance torque on a bongo board that can be rejected by the universal balancing controller described herein.

However, while testing the controllers on a nonlinear simulation of the nominal bongo board model with actuator limits of plus or minus 200 nanometers, the universal controller was able to handle a larger disturbance (86.7 nanometers for 0.1 seconds) on the board than that of the H, controller (36.2 nanometers for 0.1 seconds) and the LQR controller (31.1 nanometers for 0.1 seconds) as shown in Table II. FIG. 6 illustrates a semi-logarithmic plot 600 of the maximum disturbance torque that the universal controller was able to handle for 0.1 seconds while successfully stabilizing the family of bongo boards and curved floors for the entire range of stabilizable wheel radii of interest (e.g., from 0.01 to 122.7108 meters). As shown in FIG. 5, the maximum rejectable disturbance on the board for 0.1 seconds peaks to 353.4 nanometers for a wheel radius of 0.5 meters, then decreases and roughly plateaus to an average value of 125 nanometers after a wheel radius of 10 meters.

controllers with varying wheel density $\rho_w$. It should be noted that it was assumed that the model has constant wheel density for calculating the stabilizable wheel radii and, hence, with changing density, the mass and moment of inertia of the wheel also change as in Eq. 30. The range of density values considered was 0.1 to $10^5$. The mass/inertia matrix is close to singularity for values outside this range and, hence, was ignored in this analysis.

For the entire range of density values considered, the universal controller was able to stabilize the entire range of wheel radii considered, i.e., 0.001 to 122.7108 meters. The $H_\infty$ controller was able to stabilize only a small range of wheel density values, i.e., 24.1 to 386.9 kg·m$^{-3}$, and the corresponding stabilizable range of wheel radii was also small. However, the LQR controller successfully stabilizes the whole range of wheel density values but for a smaller range of wheel radii than that of the $H_\infty$ controller. The results in Table III and FIG. 6 show that the universal controller in Eq. 33 is completely robust to parameter uncertainties of the wheel.

The following discussion presents the nonlinear simulation results of the universal controller defined by Eq. 33 and demonstrates this controller's universality as proved using its linearized model in Table II. The constrained nonlinear dynamics of the seesaw and bongo board models were simulated in MATLAB using ode15s (a stiff numerical solver), and the actuator inputs were limited to plus/minus 200 nanom-

TABLE III

Performance comparison with other control approaches (range of stabilizable system parameters with nominal wheel radius)

| Parameter | Symbol | Unit | Nominal Value | Stabilizable Parameter Range | | |
|---|---|---|---|---|---|---|
| | | | | LQR Control | $H_\infty$ Control | Universal Control |
| Wheel | $\rho_\omega$ | kg · m$^{-3}$ | 200 | [58.090, 2672.827] | [51.966, 371.030] | [0, ∞] |
| Wheel Mass | $m_\omega$ | kg | 6.28 | [4.469, 122.990] | [0, 14.342] | [0, ∞] |
| Wheel Moment of Inertia | $I_\omega$ | 2 kg · m$^2$ | 0.035 | [0.016, 1.197] | [0, 0.112] | [0, ∞] |
| Board Mass | $m_b$ | kg | 2 | [1.466, 5.878] | [0.286, 3.812] | [0, 6.618] |
| Board Moment of Inertia | $I_b$ | kg · m$^2$ | 0.1067 | [0.010, 0.131] | [0.013, 0.189] | [0, 2.848] |
| Link-1 Mass | $m_1$ | kg | 15 | [11.229, 36.434] | [13.360, 17.106] | [4.399, 23.889] |
| Link-1 Moment of Inertia | $I_1$ | 2 kg · m$^2$ | 1 | [14.685, 15.019] | [0, 1.461] | [0, 4.426] |
| Link-1 Length | $l_1$ | m | 1 | [0.9997, 1.079] | [0.941, 1.038] | [0.778, 2.283] |
| Link-2 Half Mass | $m_2$ | kg | 15 | [14.685, 15.019] | [8.405, 16.609] | [10.194, 31.391] |
| Link-2 Half Moment of Inertia | $I_2$ | kg · m$^2$ | 2 | [1.691, 2.219] | [1.953, 2.041] | [0.986, 3.370] |
| Link-2 Half Length | $l_2$ | m | 0.1 | [0.098, 0.1005] | [0.079, 0.117] | [0.055, ∞] |

With regard to the robustness to parameter uncertainties, Table III (above) shows the range of parameter variations in the nominal bongo board model that the different controller can handle. For each parameter except the wheel density $\rho_w$ listed in Table III, while the parameter is varied, the other parameters of the system were maintained at their nominal values. For the wheel density $\rho_w$, however, the mass $m_w$ and moment of inertia $I_w$ varied according to Eq. 30. The stabilizable range of parameter values was obtained using a bisection algorithm similar to Algorithm 3. Table III shows that the universal controller outperforms both the $H_\infty$ and LQR controllers by stabilizing a significantly wider range of parameter variations for all parameters. In the above listed values, a stabilizable range written as (0, •] refers to a range whose lower bound is less than $10^{-4}$, and, similarly, a stabilizable range written as [•, ∞) refers to a range whose upper bound is greater than $10^6$.

Figure 7A:
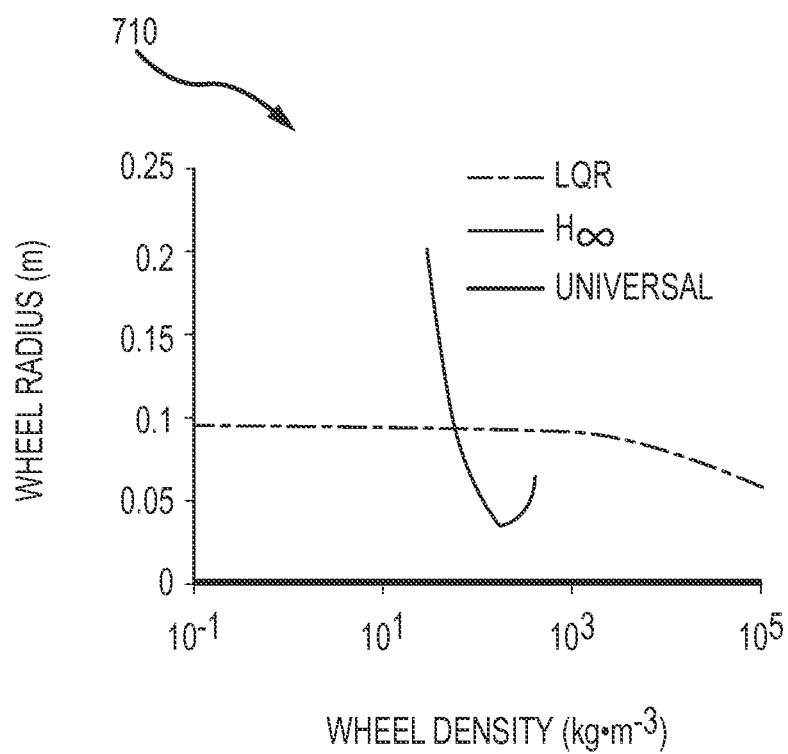
FIGS. 7A and 7B show semi-logarithmic and logarithmic plots of the minimum and maximum values of the stabilizable wheel radii, respectively, for the different controllers with varying wheel density.
Figure 7B:
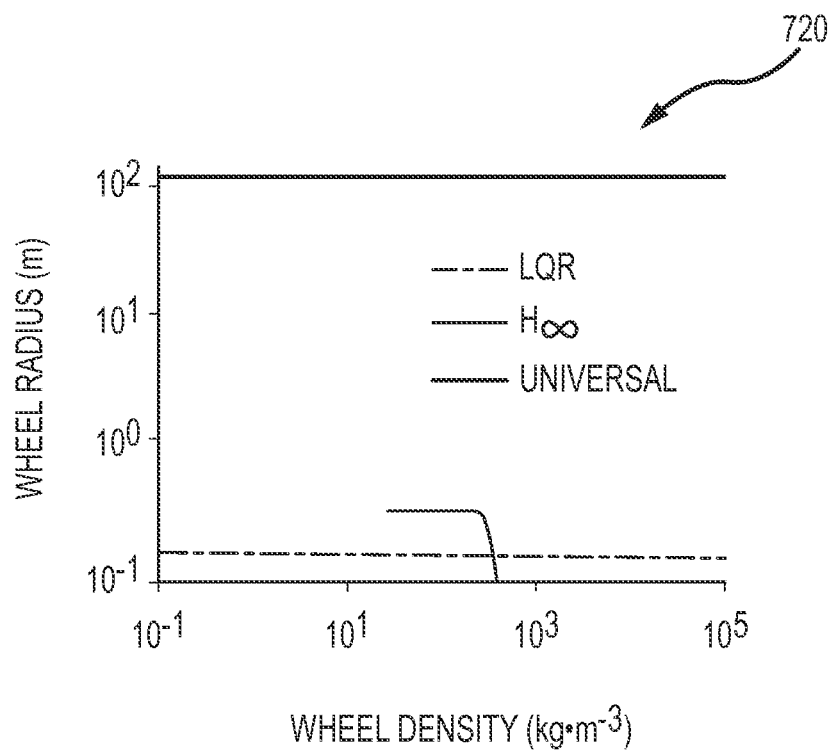

FIGS. 7A and 7B show semi-logarithmic and logarithmic plots 710 and 720 of the minimum and maximum values of the stabilizable wheel radii, respectively, for the different eters. As described above, the curved floor and flat floor models are derived as special cases of the bongo board and seesaw models, respectively. It should also be noted that the planar bipedal robot considered here is a parallel mechanism with only one DOF, and, hence, the actuator torques at the hip and ankle joints are duplicated, with the hip torques being equal and opposite to the angle torques.

Figure 8A:
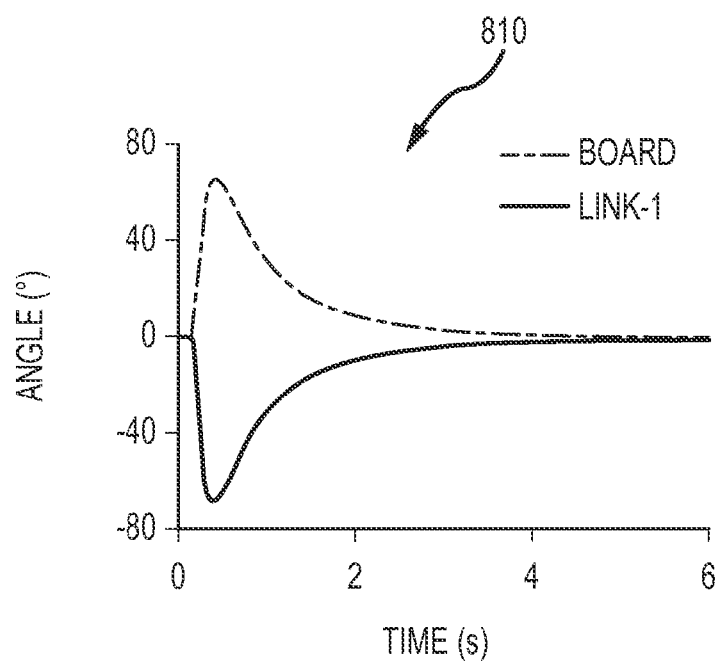
FIGS. 8A and 8B illustrate angle and torque versus time plots showing the universal controller's successful effort in stabilizing a seesaw when subjected to a disturbance.
Figure 8B:
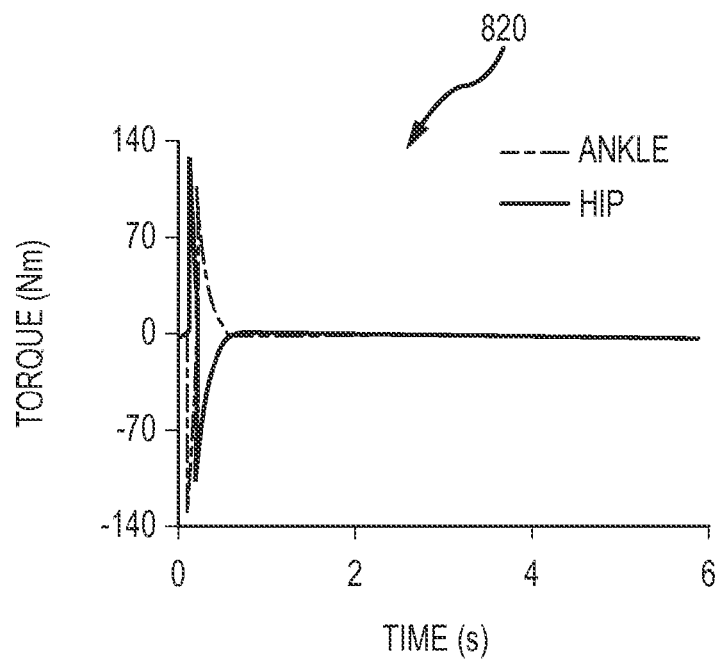
Figure 9A:
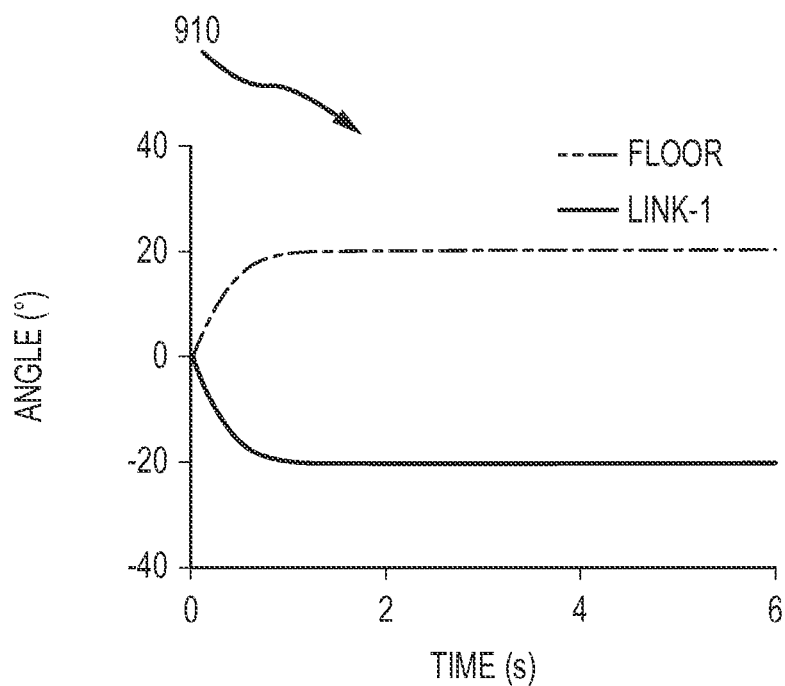
FIGS. 9A and 9B illustrate angle versus time plots showing the universal controller's successful effort in stabilizing a robot on moving floors (with FIG. 9A having a floor tilting to 20 degrees in 2 seconds and FIG. 9B having a floor rocking with an amplitude of 20 degrees at 1 Hertz)
Figure 9B:
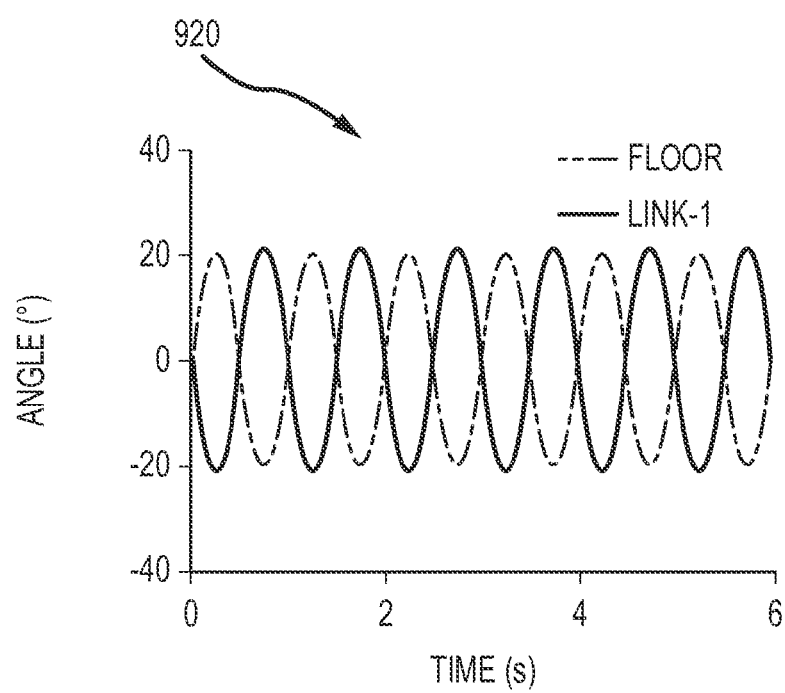

FIG. 8A shows with plot/graph 810 the trajectories of the seesaw's board and robot's link-1 angles resulting from the universal controller's successful effort in stabilizing the nominal system when the board was subjected to a disturbance of 120 nanometers for 0.1 seconds. The corresponding ankle and hip trajectories are shown in the plot/graph 820 in FIG. 8B. FIG. 9A provides a plot/graph 910 showing the floor and link-1 angle trajectories of the robot when the universal controller successfully stabilizes the system on a tilting floor that tilts to 20 degrees in 2 seconds. Similarly, the universal controller's ability to successfully stabilize the system on a rocking floor is shown in plot/graph 920 of FIG. 9B, with the floor rocking at 1 Hertz with an amplitude of 20 degrees.

Figure 10A:
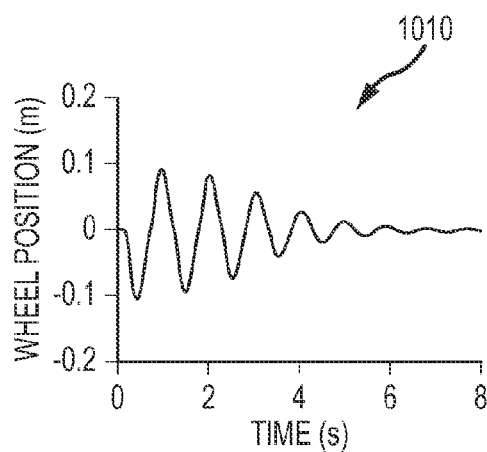
FIGS. 10A-10L provide graphs or plots of wheel position, angle, and actuator torque values over time during a universal controller's successful effort in stabilizing bongo boards with four different wheel radii when subjected to four different board disturbances for a period of time.
Figure 10B:
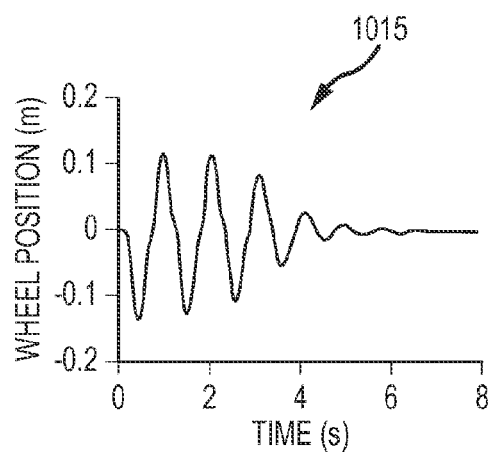
Figure 10C:
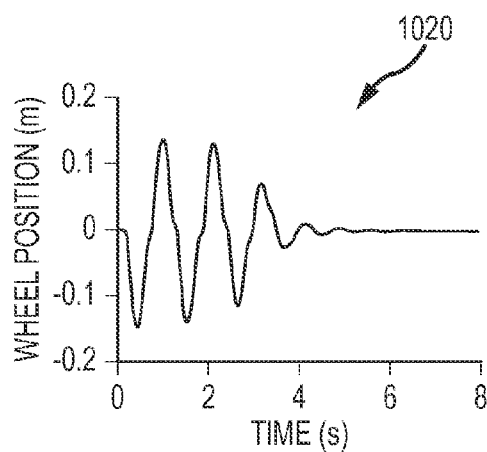
Figure 10D:
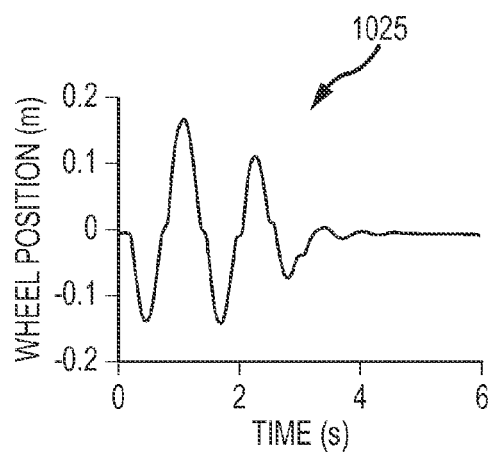
Figure 10E:
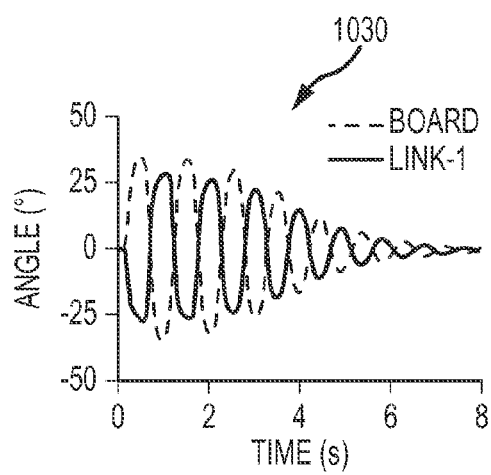
Figure 10F:
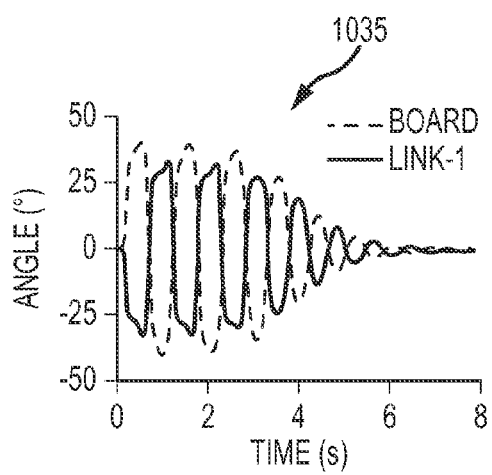
Figure 10G:
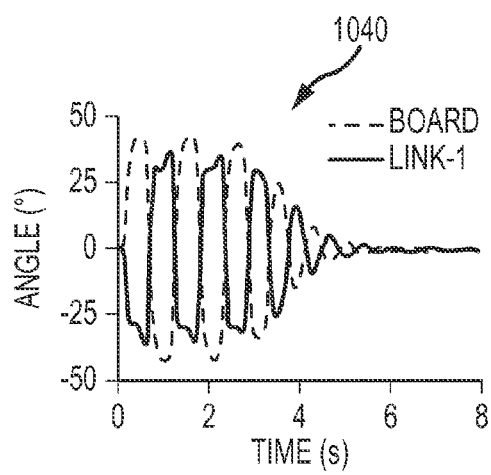
Figure 10H:
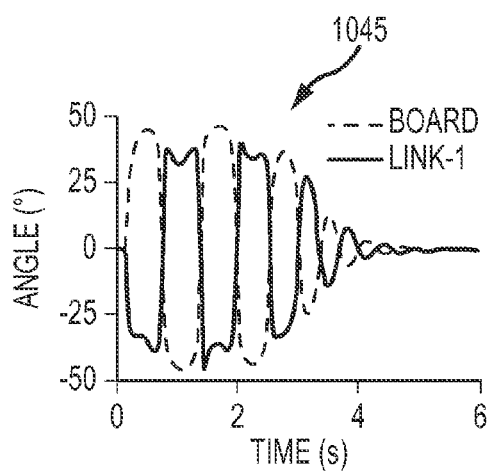
Figure 10I:
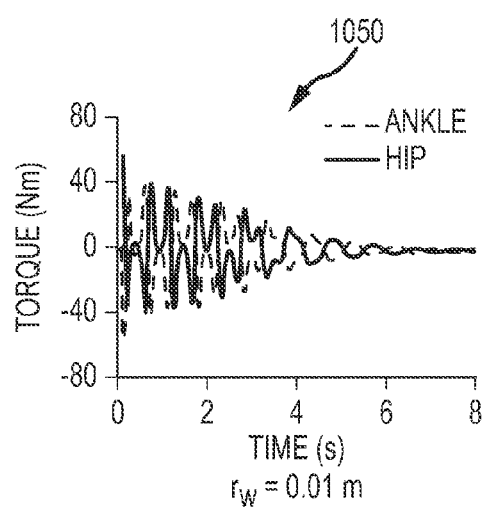
Figure 10J:
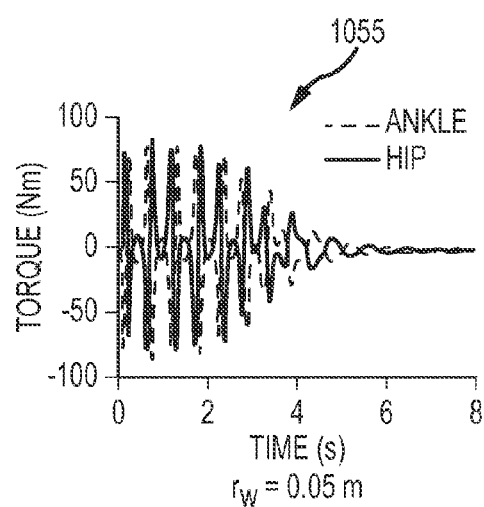
Figure 10K:
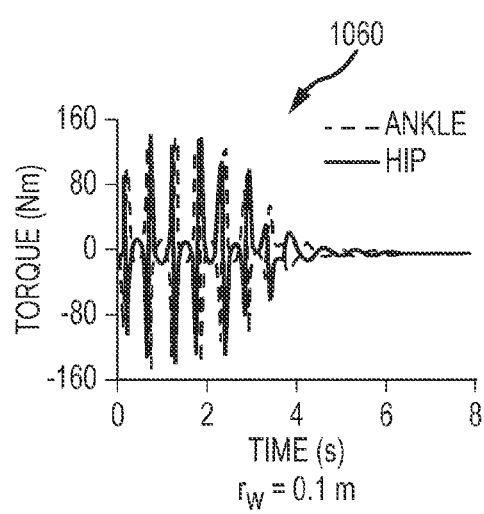
Figure 10L:
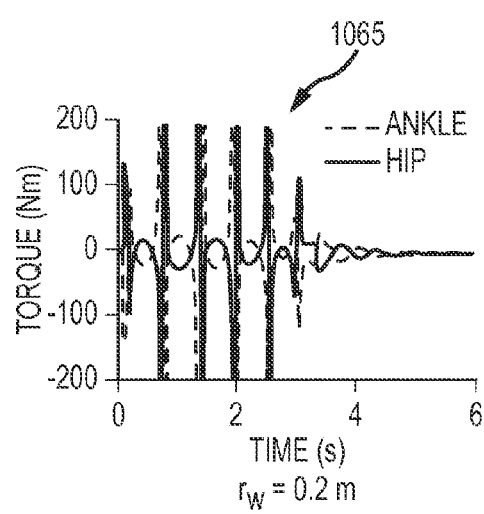
Figure 11A:
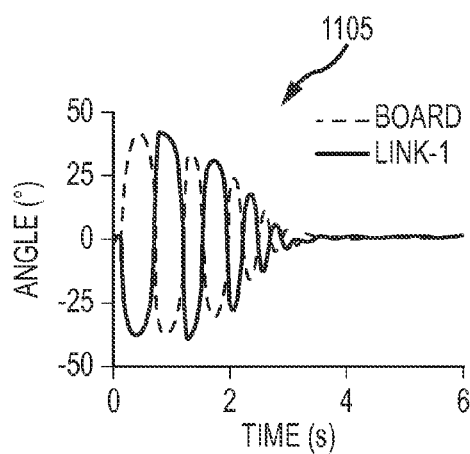
FIGS. 11A-11H provide graphs or plots of angle and torque values over time during a universal controller's successful effort in stabilizing bongo boards with different wheel radii when subjected to four different disturbances for a like amount of time.
Figure 11B:
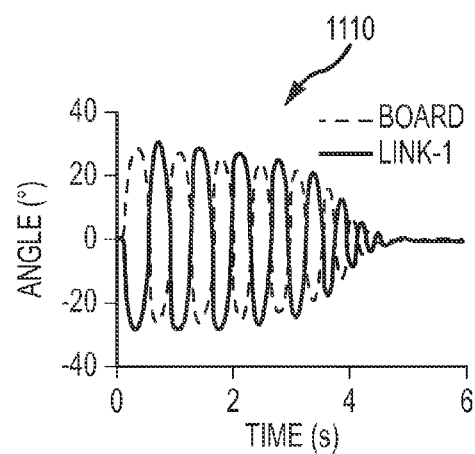
Figure 11C:
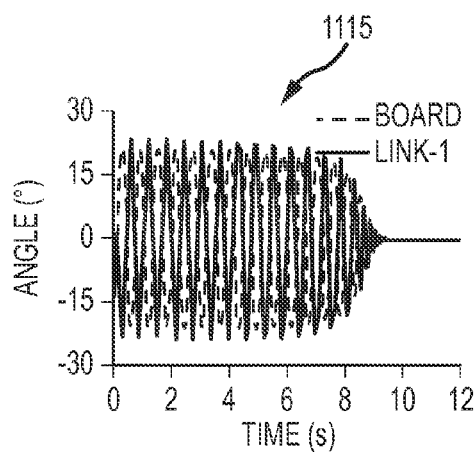
Figure 11D:
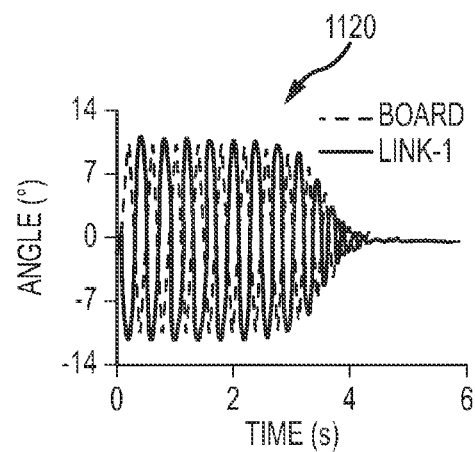
Figure 11E:
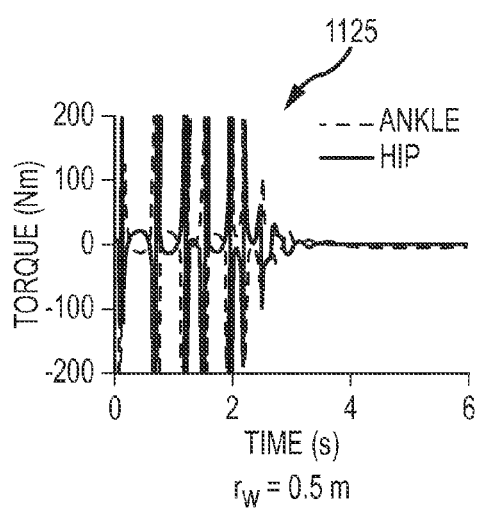
Figure 11F:
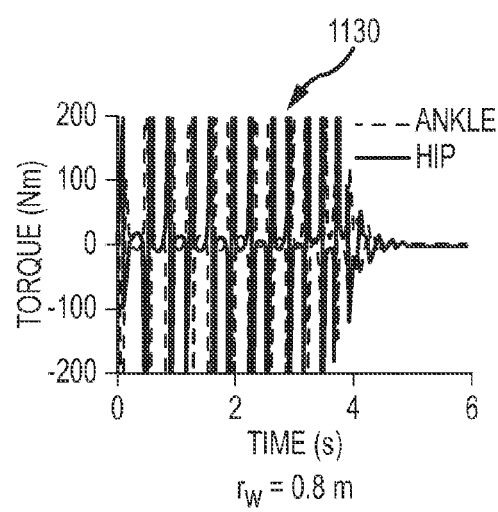
Figure 11G:
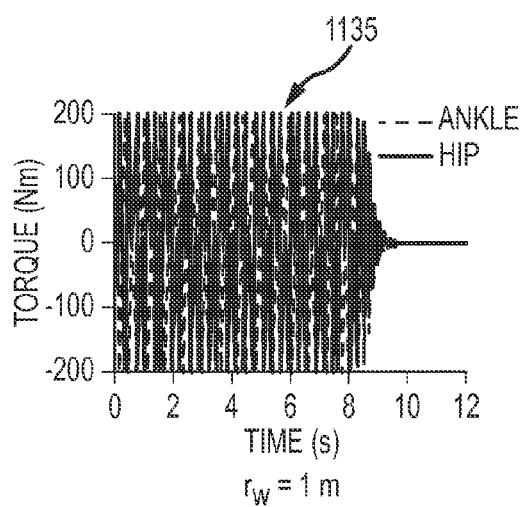
Figure 11H:
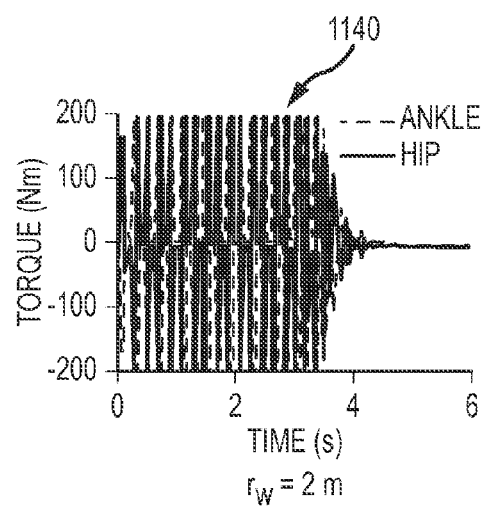
Figure 12A:
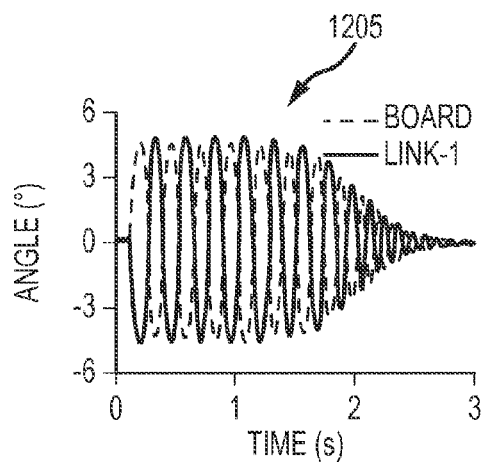
FIGS. 12A-12H provide graphs or plots of angle and torque values over time during the use of the universal controller to stabilize bongo boards when subjected to four different disturbances over a set time period.
Figure 12B:
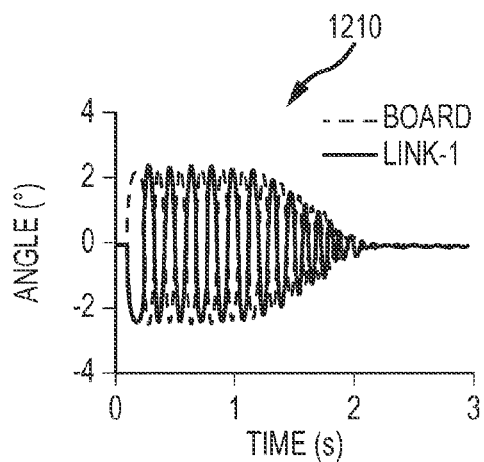
Figure 12C:
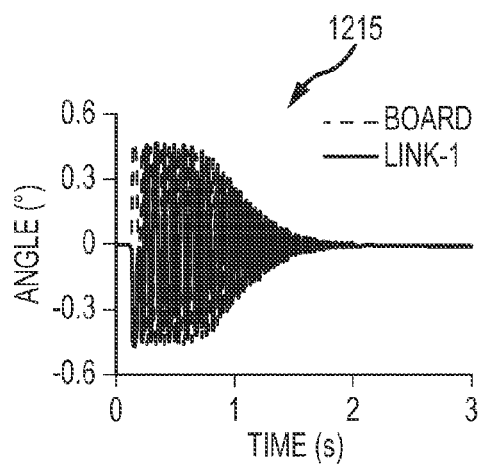
Figure 12D:
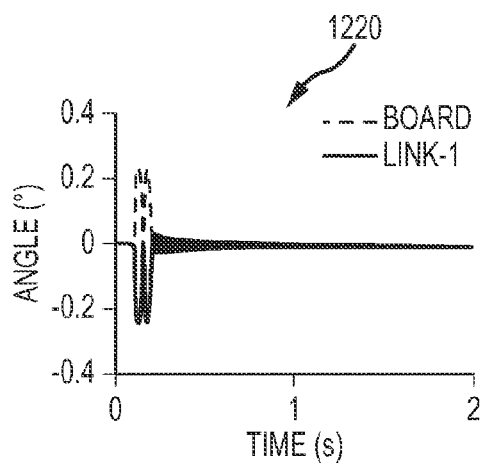
Figure 12E:
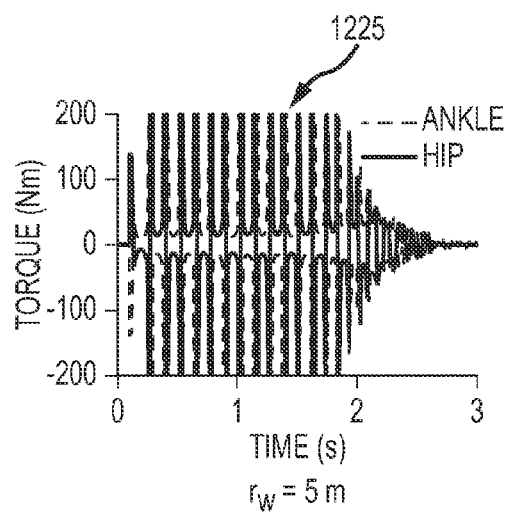
Figure 12F:
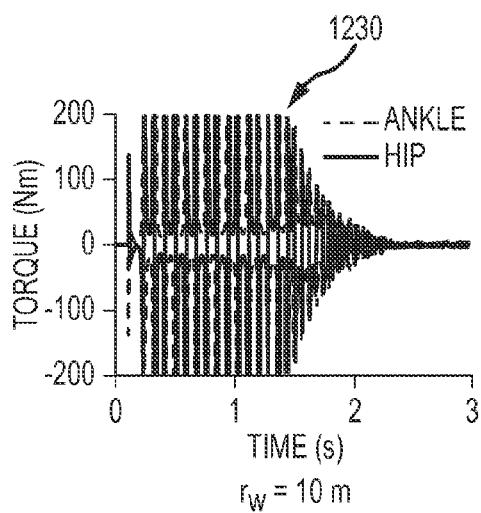
Figure 12G:
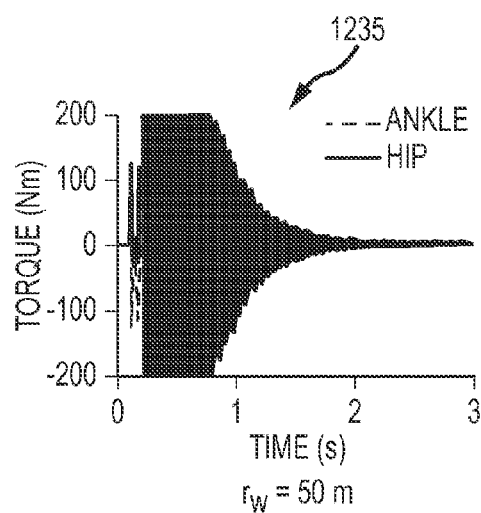
Figure 12H:
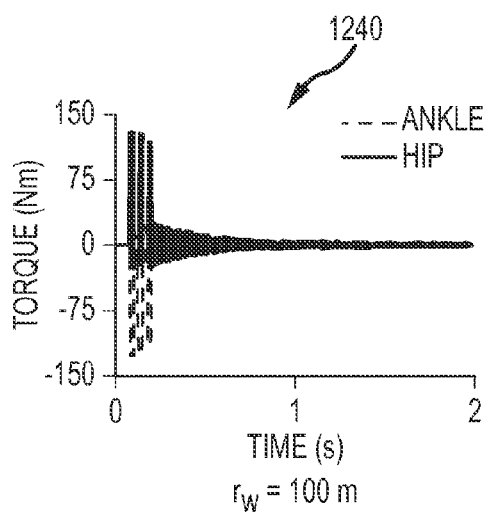

FIGS. 10A-10L provide graphs or plots 1010, 1015, 1020, 1025, 1030, 1035, 1040, 1045, 1050, 1055, 1060, and 1065 of wheel position, angle, and actuator torque values over time during a universal controller's successful effort in stabilizing bongo boards with four different wheel radii when subjected to four different board disturbances for a period of time. Particularly, FIG. 10A shows with plot 1010 the wheel position trajectory of a bongo board model with wheel radius $r_w$=0.01 meters that is controlled using the universal controller in Eq. 33 when subjected to a disturbance torque of 6.9 Nm for 0.1 seconds on the board. The resulting global board angle and link-1 angle trajectories are shown in the plot 1030 of FIG. 10E, and the corresponding equal and opposite ankle and hip torque trajectories are shown in the plot 1050 of FIG. 10I. Similarly, FIGS. 10B, 10F, 10J, FIGS. 10C, 10G, 10K, and FIGS. 10D, 10H, 10L shows plots 1015, 1035, 1055, plots 1020, 1040, 1060, and plots 1025, 1045, 1065 of the universal controller's successful attempt at stabilizing bongo board models with radii $r_w$=0.05 meters, $r_w$=0.1 meters, and $r_w$=0.2 meters, respectively, when subjected to disturbance torques of 40 Nm, 86.7 Nm, and 186.3 Nm, respectively, for 0.1 seconds on the board.

FIGS. 11A-11H provide graphs or plots 1105, 1110, 1115, 1120, 1125, 1130, 1135, and 1140 of angle and torque values over time during the use of the universal controller to stabilize bongo boards when subjected to four different disturbances over a set time period. Particularly, the disturbance was applied for 0.1 seconds and plots 1105 and 1125 correspond to a disturbance of 353.4 Nm, plots 1110, 1130 correspond to a disturbance of 297.5 Nm, plots 1115, 1135 correspond to a disturbance of 246.3 Nm, and plots 1120, 1140 correspond to a disturbance of 162.3 Nm with wheel radii $r_w$ of 0.5 meters, 0.8 meters, 1 meter, and 2 meters, respectively. Similarly, FIGS. 12A-12H provide graphs or plots 1205, 1210, 1215, 1220, 1225, 1230, 1235, and 1240 of angle and torque values over time during the use of the universal controller to stabilize bongo boards when subjected to four different disturbances over a set time period. Particularly, the disturbance was applied for 0.1 seconds and plots 1205 and 1225 correspond to a disturbance of 131.5 Nm, plots 1210, 1230 correspond to a disturbance of 129.6 Nm, plots 1215, 1235 correspond to a disturbance of 119.5 Nm, and plots 1220, 1240 correspond to a disturbance of 123.6 Nm with wheel radii $r_w$ of 5 meters, 10 meters, 50 meters, and 100 meters, respectively.

FIGS. 11 and 12 show the universal controller's success in stabilizing the bongo board models with wheel radii ranging from 0.5 to 100 meters when subjected to different disturbance torques on the board for 0.1 seconds. All disturbance torques shown in FIGS. 10-12 were the maximum disturbances that the universal controller was able to handle for each particular wheel radius. The wheel position trajectories are ignored in FIGS. 11 and 12 since the wheel barely moves because of the large mass and moment of inertia of the wheel with increasing wheel radii. For wheel radius $r_w$ greater than 2, the mass and moment of inertia of the wheel are large enough, i.e., $m_w$ greater than 2513.3 kg, $I_w$ greater than 5026.5 kg·m², that the wheel does not move (less than $10^{-3}$ meters of movement). Hence, the system reduces to the robot balancing on a board on top of a curved floor. Moreover, with wheel radius $r_w$ greater than 20 meters, the surface of contact of the bongo board with the wheel is flat and, hence, the system reduces to the robot balancing on a board on top of a flat floor.

It is important to note that the robot is a parallel mechanism with only one DOF. Hence, its actuation is duplicated with the ankle and hip torques having equal and opposite values. Moreover, the ankle and hip torques are limited to plus/minus 200 Nm such that one can observe the torque trajectories saturating in the plots in the FIGS. 10-13. It should also be noted that the plots shown here are for the maximum disturbance torques that the universal controller can handle for the different wheel radii, and input saturations do not result for smaller disturbance torques.

FIGS. 8-12 are useful for verifying in simulation that the universal controller of Eq. 33 can indeed successfully stabilize the nonlinear dynamics of seesaw, flat floor, and a family of bongo board and curved floor models as demonstrated using their linearized dynamics of Table II. Thus, through detailed analysis and simulations, this description has shown that the output feedback controller in Eq. 33, which was derived using Algorithm 2, is truly a universal controller for the family of dynamic (and static) environments discussed herein.

The above description teaches a methodology or algorithm for deriving a universal balancing controller for providing control signals or stabilizing a bipedal robot in static environments (such as flat floors) and in dynamic environments (such as seesaw and bongo board type supports). Among the keys discussed that are useful in providing a universal balance controller are: (1) formulate the controller as an output feedback controller so that it can map the outputs of different dynamic systems like a seesaw and a bongo board to the control inputs of the robot including the ankle and hip torques (this formulation enables a single controller to stabilize different dynamic systems with state spaces of different dimensions) and (2) use the bongo board model as a generic model where different wheel radii can represent a wide range of environments including a seesaw and a bongo board as well as flat and curved floors/surface, where a zero radius corresponds to a seesaw and an infinite radius corresponds to a flat floor (the generic model allows the controller to handle different environments by changing the wheel radius continuously rather than dealing with multiple discrete models).

In this regard, an optimization algorithm is described herein that finds a set of output feedback gains that maximizes the range of wheel radii that the controller can stabilize. Also, in this description, it was assumed that the feet of the bipedal robot were always in flat contact with the upper surface of the bongo board without slipping. Prior to this universal balancing controller, there was no such universal control design in which a single controller stabilizes dynamic systems with different dimensional state spaces. Previous solutions, instead, included environment-specific controller designs, e.g., separate seesaw and bongo board balancing controllers.

The universal controller stabilizes different dynamic systems, which enables a bipedal robot with such a controller to have no knowledge of the environment in which it is balancing but yet still successfully balance and handle disturbances. This result eliminates the need to model dynamic environments (like a seesaw and a bongo board) and allows the same controller to be re-used in all environments or in multiple unstable platforms. Hence, a significant amount of time is saved that would otherwise have been spent in tuning controllers for specific environments.

Balancing robots controlled using this technique may have many uses such as in an entertainment setting (e.g., a robot-based attraction of a theme or amusement park or the like) or in an industrial or manufacturing setting. For example, one can readily imagine an implementation in which balancing robots perform entertaining tasks (e.g., a number of circus tasks) like balancing on a seesaw, on a bongo board, on a curved surface or floor, and the like. Moreover, in real time, a bipedal robot with the universal balancing controller can switch environments, which makes its performance much more interesting and exciting for observers or an audience.

This description shows conclusively that global pelvis position, velocity, and link angle measurements are sufficient to stabilize a planar bipedal robot in dynamic, unstable environments like seesaws and bongo boards. Output feedback control was proposed as an approach to design a single controller that stabilizes planar bipedal robots in different dynamic environments with state spaces of different dimensions. An algorithm that optimized output feedback controllers to maximize the range of stabilizable systems was also presented. A first of its kind universal balancing controller that stabilizes a family of bongo board, seesaw, and curved and flat floor models was derived and fully described.

The robustness of the derived universal controller to disturbances and parameter uncertainties was analyzed in the description and compared against LQR and $H_\infty$ controllers. Since the LQR controller derived for the bongo board model is a state feedback controller, it cannot be directly used for stabilizing the planar bipedal robot on a seesaw, a flat floor, or a curved floor model. Although the $H_\infty$ controller derived for the bongo board model being an output feedback controller can be used for stabilizing a bipedal robot in other dynamic environments, the optimization algorithm failed to find a $H_\infty$ controller that stabilized the seesaw and also the flat floor models. Moreover, it was shown in this description that the universal controller performed significantly better than the LQR and $H_\infty$ controllers in both disturbance rejection and also in robustness to parameter uncertainties. Several nonlinear simulation results were also presented that demonstrated the robustness and universality of the derived universal balancing controller.

We claim:

1. A robot, comprising:
  three or more rigid links;
  joints pivotally connecting pairs of the rigid links; and
  an actuator associated with each of the joints; and
  a universal balancing controller comprising an output feedback control module providing control signals to selectively drive the actuators to balance the robot on a support element,
  wherein the control signals are generated in response to processing of global robot data from sensors associated with the rigid links or the joints,
  wherein the universal balancing controller acts as a standalone controller that generates the controls signals so as to stabilize the robot in different stable and unstable environments,
  wherein the support element comprises a dynamic, unstable environment such that the universal balancing controller stabilizes the robot in the dynamic, unstable environment,
  wherein the dynamic environment comprises a bongo board, a seesaw, or a board balanced upon a curved, stable floor, and
  wherein the robot is positioned and balancing on the bongo board, the seesaw, or the board balanced upon the curved, stable floor.

2. The robot of claim 1, wherein the rigid links comprise at least two leg links and a pelvis link connecting ends of the two leg links, wherein the joints comprise a pair of ankle joints and a pair of hip joints, and the global robot data comprises link angles and global pelvis measurements.

3. The robot of claim 2, wherein the global pelvis measurements comprise measurements of a position and a velocity of the pelvis link.

4. The robot of claim 1, wherein the control signals stabilize the bongo board, the seesaw, or the board balanced upon the curved, stable floor via controlled movement of the robot.

5. The robot of claim 1, wherein one of the different stable and unstable environments comprises a static environment that comprises a flat floor or a flat and sloped floor.

6. A bipedal robot with universal balancing control for use in a variety of environments, comprising:
  a pair of legs each supported at a first end by a support assembly;
  a pelvis interconnecting second ends of the legs via a pair of hip joints;
  actuators driving operation of the hip joints and joints in the legs; and
  an output feedback controller providing control signals to selectively drive the actuators to balance the robot on a support surface of the support assembly,
  wherein the control signals are generated in response to processing of data from sensors associated with the legs or the pelvis,
  wherein the control signals are generated without any measurement of parameters of the support assembly,
  wherein the output feedback controller is configured to provide the control signals both when the support assembly defines a dynamic, unstable environment and when the support assembly defines a static, stable environment,
  wherein the dynamic, unstable environment includes a seesaw, a bongo board, or a board balanced on a curved, stable floor, and
  wherein the legs are supported by and are balancing on the bongo board, the seesaw or the board balanced on the curved stable floor.

7. The bipedal robot of claim 6, wherein the control signals are adapted to stabilize the seesaw or the bongo board with the robot balanced on a board of the seesaw, a board of the bongo board, or the board balanced on the curved, stable floor and after a disturbance is applied to a corresponding one of the boards.

8. The bipedal robot of claim 6, wherein the data comprises measurements or determinations of a position and a velocity of the pelvis.

9. The bipedal robot of claim 8, wherein the data further comprises at least one link angle associated with one of the legs.

10. A universal balancing control method, comprising:
  from sensors on a robot balanced within a dynamic, unstable environment, receiving a set of global robot data;
  without measurements of the dynamic, unstable environment, processing the set of global robot data to generate a torque associated with actuators of a set of joints of the robot;
  providing balancing control signals based on the generated torques to controllers of the actuators, whereby the robot balances within the dynamic, unstable environment and concurrently attempts to stabilize the dynamic, unstable environment; and
  repeating the receiving, the processing, and the providing steps,
  wherein the dynamic, unstable environment comprises a bongo board, a seesaw, or a board balanced upon a curved, stable floor, and
  wherein the robot is positioned and balancing on the bongo board, the seesaw, or the board balanced upon the curved, stable floor.

11. The method of claim 10, wherein the robot comprises a bipedal robot and the set of global robot data comprises link angles and global pelvis measurements.

12. The method claim 11, wherein the joints include two ankle joints and two hip joints.

13. The method of claim 11, wherein the global pelvis measurements include a global position of a pelvis of the robot and velocity of the pelvis.

14. The method of claim 10, wherein the repeating step is performed after each disturbance of the dynamic, unstable environment and wherein the dynamic, unstable environment is stabilized via the providing of the control signals within about 20 seconds.

15. The method of claim 1, wherein at least two of the links remain in contact with a surface of the support element.

16. The method of claim 1, wherein the processing of the global robot data is performed without using environment information including measurements pertaining to the support element.

\* \* \* \* \*